(12) United States Patent
Singh et al.

(10) Patent No.: US 11,113,327 B2
(45) Date of Patent: Sep. 7, 2021

(54) DOCUMENT INDEXING, SEARCHING, AND RANKING WITH SEMANTIC INTELLIGENCE

(71) Applicant: OPTUM TECHNOLOGY, INC., Eden Prairie, MN (US)

(72) Inventors: Sanjay Kumar Singh, Karnataka (IN); Anshuman Sinha, Karnataka (IN); Piyush Gupta, Karnataka (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 213 days.

(21) Appl. No.: 16/274,464

(22) Filed: Feb. 13, 2019

(65) Prior Publication Data

US 2020/0257712 A1    Aug. 13, 2020

(51) Int. Cl.
  *G06F 16/33*    (2019.01)
  *G06F 16/31*    (2019.01)
  *G06F 16/93*    (2019.01)

(52) U.S. Cl.
  CPC ........ *G06F 16/3344* (2019.01); *G06F 16/316* (2019.01); *G06F 16/93* (2019.01)

(58) Field of Classification Search
  CPC .... G06F 16/3344; G06F 16/93; G06F 16/316; G06F 16/338
  USPC ......................................................... 707/736
  See application file for complete search history.

(56) References Cited

U.S. PATENT DOCUMENTS

| 5,619,410 | A | * | 4/1997 | Emori | G06F 16/3335 |
| | | | | | 704/7 |
| 7,707,142 | B1 | | 4/2010 | Ionescu | |
| 7,809,714 | B1 | * | 10/2010 | Smith | G06F 16/2425 |
| | | | | | 707/713 |
| 7,996,379 | B1 | | 8/2011 | Jain | |
| 8,321,403 | B1 | * | 11/2012 | Wu | G06F 16/9574 |
| | | | | | 707/713 |
| 8,463,593 | B2 | | 6/2013 | Pell et al. | |
| 2007/0143273 | A1 | | 6/2007 | Knaus et al. | |

(Continued)

OTHER PUBLICATIONS

Zhu, "Improving Search Engines Via Classification," Doctoral Thesis, University of London, May 2011, 154 pages.

(Continued)

*Primary Examiner* — Cam Y T Truong
(74) *Attorney, Agent, or Firm* — Alston & Bird LLP

(57) ABSTRACT

There is a need for solutions that perform preprocessing and/or searching of documents with semantic intelligence. This need can be addressed by, for example, by performing pre-processing of each document of a plurality of documents to generate an indexed representation for the document by identifying sentences in the document; determining, for each n-gram of one or more n-grams associated with the document, one or more n-gram semantic scores based semantic proximity indicators for the n-gram; determining, based at least in part on each one or more n-gram semantic scores, one or more sentence semantic labels for each sentence in the document; and determining the indexed representation for the document based at least in part on the one or more sentence semantic labels for the document; performing the search query based each indexed representation associated with a document; and transmitting the result to a computing device associated with the search query.

14 Claims, 17 Drawing Sheets

(56) References Cited

U.S. PATENT DOCUMENTS

| | | | | |
|---|---|---|---|---|
| 2010/0036829 | A1* | 2/2010 | Leyba | G06F 16/3344 |
| | | | | 707/739 |
| 2014/0350941 | A1* | 11/2014 | Zeigler | G06F 3/167 |
| | | | | 704/275 |
| 2015/0106078 | A1* | 4/2015 | Chang | G06F 16/35 |
| | | | | 704/9 |
| 2015/0310005 | A1* | 10/2015 | Ryger | G06F 16/3334 |
| | | | | 707/706 |
| 2015/0356418 | A1* | 12/2015 | Yampolska | G06F 16/367 |
| | | | | 707/739 |
| 2016/0132789 | A1* | 5/2016 | Flinn | G06N 5/048 |
| | | | | 706/14 |
| 2017/0286401 | A1* | 10/2017 | He | G06N 3/0454 |
| 2018/0039690 | A1 | 2/2018 | Zhai et al. | |
| 2018/0285576 | A1* | 10/2018 | Cannings | G06N 3/02 |
| 2019/0130025 | A1* | 5/2019 | Crudele | G06F 16/31 |
| 2019/0327331 | A1* | 10/2019 | Natarajan | G06F 16/90332 |

OTHER PUBLICATIONS

Wang et al., "Clinical Word Sense Disambiguation With Interactive Search and Classification," AMIA Annual Symposium Proceedings, (2016), pp. 2062-2071.

Struder et al., "Exploiting Social Semantics for Multilingual Information Retrieval," Doctoral Theses, Karlsruhe Institute of Technology, Jul. 22, 2011, 209 pages.

Mizera-Pietraszko et al., "Extraction of Medical Terms for Word Sense Disambiguation Within Multilingual Framework," 2016 Sixth International Conference on Innovative Computing Technology (INTECH), Dublin, (2016), pp. 478-484. doi: 10.1109/INTECH. 2016.7845125. [article, online], [retrieved Jun. 3, 2019], retrieved from the Internet <URL: https://ieeexplore.ieee.org/document/7845125?denied=>.

McInnes, et al., "Determining the Difficulty of Word Sense Disambiguation," Journal of Biomedical Informationgs, vol. 47, (2014), pp. 83-90.

Lin et al., "A Document Clustering and Ranking System for Exploring MEDLINE Citations," Journal of the American Medical Informatics Association, vol. 14, No. 5, Sep./Oct. 2007, pp. 651-661.

Hung et al., "Neural Network-Based Document Clustering Using WordNet Ontologies," International Journal of Hybrid Intelligent Systems, vol. 1, No. 3-4, (2004), 16 pages.

Hemayati, et al., "Categorizing Search Results Using WordNet and Wikipedia," In: Gao H., Lim L., Wang W., Li C., Chen L. (eds) Web-Age Information Management. WAIM 2012. Lecture Notes in Computer Science, vol. 7418, Springer, Berlin, Heidelberg, Germany, 12 pages.

Hawker et al., "Improved Default Sense Selection for Word Sense Disambiguation," Proceedings of the 2006 Australasian Language Technology Workshop (2006), pp. 11-17.

Gutierrez et al., "UMCC_DLSI: Reinforcing a Ranking Algorithm With Sense Frequencies and Multidimensional Semantic Resources to Solve Multilingual Word Sense Disambiguation," Second Joint Conference on Lexical and Computational Semantics (*SEM), vol. 2: Seventh International Workshop on Semantic Evaluation (SemEval 2013), Atlanta Georgia, Jun. 14-15, 2013, pp. 241-249.

Garla et al., "Knowledge-Based Biomedical Word Sense Disambiguation: An Evaluation and Application to Clinical Document Classification," Journal of the American Medical Informatics Association, vol. 21, Issue 3, May 2014, p. 568.

Arora et al., "Semantic Searching and Ranking of Documents Using Hybrid Learning System and WordNet," (IJACSA) International Journal of Advanced Computer Science and Applications, vol. 3, No. 6, (2011), pp. 113-120.

Aronson, "Effective Mapping of Biomedical Text to the UMLS Metathesaurus: The MetaMap Program," Proceedings AMIA Symposium (2001), pp. 17-21.

Agirre et al., "Personalizing PageRank for Word Sense Disambiguation," Proceedings of the 12th Conference of the European Chapge of the ACL, Mar. 30-Apr. 3, 2009, Athens, Greece, pp. 33-41.

"About MEDLINE® and PubMed®: The Resources Guide," [article, online], [retrieved Jun. 3, 2019], retrieved from the Internet <URL: https://www.nlm.nih.gov/bsd/pmresources.html> (5 pages).

* cited by examiner

700

The Narmada, also called the Rewa and previously also known as Nerbudda, even Shankari, is a river in central India and the sixth longest river in the Indian subcontinent. It is the third longest river that flows entirely within India, after the Godavari, and the Krishna. It is also known as "Life Line of Gujarat and Madhya Pradesh" for its huge contribution to the state of Gujarat and Madhya Pradesh in many ways. Narmada rises from Amarkantak Plateau near Anuppur district. It forms the traditional boundary between North India and South India and flows westwards over a length of 1,312 km (815.2 mi) before draining through the Gulf of Khambhat into the Arabian Sea, 30 km (18.6 mi) west of Bharuch city of Gujarat. Vadodara (formerly known as Baroda) is the third largest city in the Western Indian state of Gujarat, after Ahmedabad and Surat. It is the administrative headquarters of Vadodara District and is located on the banks of the Vishwamitri river, 130 kilometers (86 mi) from the state capital Gandhinagar. The railway line and NH 8 that connect Delhi and Mumbai pass through Vadodara. The Bank of Baroda (BoB) is an Indian state-owned international banking and financial services company headquartered in Vadodara (earlier known as Baroda) in Gujarat, India. It has a corporate office in Mumbai. The erosion of soil at the shore of river is natural but it has been accelerated by the humans in recent past due to deforestation in large section of the forest adjoining river Ganges in Himalayan ranges leading to frequent landslides causing death. Vegetation can have a significant impact on bank erosion. Generally, banks with vegetation erode more slowly than those without. Dense vegetation growing on the bank face can deflect flowing water and prevent fluvial erosion. Roots generally increase the strength of bank material, making a bank less prone to mass failure. The Indian institute of technology powai is among top rated indian college, almost all the banks in india provide financial aid for admission in that institute. We cannot say that the institute is located at shore of any river but has a huge powai lake to provide you with very similar experience. Someone need to take a note that, the bank of Baroda near the bank of Narmada is dangerously surviving. Tribal village Anjanwada on the banks of the Narmada are stressed due to Government inaction. It is turning the Banks of the Narmada into Salt Pans. Rural areas in the downstream of the Narmada dam in the Bharuch district of Gujarat have been in the midst of one of the worst environmental disasters. Massive sea water intrusion from the Bay of Khambhat, for upto 40 kilometres eastwards into the Narmada valley has allegedly "destroyed" 10,000 hectares of agricultural land situated at the bank of river narmada.

FIG. 7

| | | | | | |
|---|---|---|---|---|---|
| The | 46 | 0.9180035565 | for | 3 | 0.9946523406 |
| Narmada | 10 | 0.9821745689 | its | 2 | 0.9964349386 |
| also | 5 | 0.9910873446 | huge | 3 | 0.9946523406 |
| called | 1 | 0.9982174689 | contribution | 1 | 0.9982174689 |
| Rewa | 1 | 0.9982174689 | to | 11 | 0.9900392157 |
| and | 14 | 0.9750445563 | state | 3 | 0.9946523406 |
| previously | 1 | 0.9982174689 | many | 1 | 0.9982174689 |
| known | 4 | 0.9928698375 | ways | 1 | 0.9982174689 |
| as | 4 | 0.9928698375 | rises | 1 | 0.9982174689 |
| Narbudda | 1 | 0.9982174689 | from | 5 | 0.9910873446 |
| even | 1 | 0.9982174689 | Amarkantak | 1 | 0.9982174689 |
| Shankari | 1 | 0.9982174689 | Plateau | 1 | 0.9982174689 |
| is | 17 | 0.9866669897 | near | 3 | 0.9946523406 |
| a | 9 | 0.9839657219 | Anuppur | 1 | 0.9982174689 |
| river | 8 | 0.9857397597 | district | 3 | 0.9946523406 |
| in | 18 | 0.9867914439 | forms | 1 | 0.9982174689 |
| central | 1 | 0.9982174689 | traditional | 1 | 0.9982174689 |
| India | 6 | 0.9893048138 | boundary | 1 | 0.9982174689 |
| sixth | 1 | 0.9982174689 | between | 1 | 0.9982174689 |
| longest | 2 | 0.9964349386 | North | 1 | 0.9982174689 |
| Indian | 6 | 0.9893048138 | South | 1 | 0.9982174689 |
| subcontinent | 1 | 0.9982174689 | westwards | 1 | 0.9982174689 |
| , | 7 | 0.9875222829 | over | 1 | 0.9982174689 |
| third | 1 | 0.9982174689 | length | 1 | 0.9982174689 |
| that | 5 | 0.9910873446 | 1312 | 1 | 0.9982174689 |
| flows | 2 | 0.9964349386 | km | 2 | 0.9964349386 |
| entirely | 1 | 0.9982174689 | (815.2 | 1 | 0.9982174689 |
| within | 1 | 0.9982174689 | mi) | 1 | 0.9982174689 |
| after | 2 | 0.9964349386 | before | 1 | 0.9982174689 |
| Godavari | 1 | 0.9982174689 | draining | 1 | 0.9982174689 |
| Krishna | 1 | 0.9982174689 | through | 2 | 0.9964349386 |
| Life | 1 | 0.9982174689 | Gulf | 1 | 0.9982174689 |
| Line | 2 | 0.9964349386 | Khambhat | 2 | 0.9964349386 |
| of | 36 | 0.9358298877 | into | 3 | 0.9946523406 |
| Gujarat | 6 | 0.9893048138 | Arabian | 1 | 0.9982174689 |
| Madhya | 2 | 0.9964349386 | Sea | 2 | 0.9964349386 |
| Pradesh | 2 | 0.9964349386 | 30 | 1 | 0.9982174689 |

DOCUMENT INDEXING, SEARCHING, AND RANKING WITH SEMANTIC INTELLIGENCE

BACKGROUND

Automatic indexing, searching, and ranking of documents, e.g., natural language documents, are important data analysis tasks that require effective feature extraction from those documents. Many existing indexing, ranking, and/or searching solutions suffer from significant drawbacks related to their accuracy and/or efficiency. For example, many existing indexing and searching solutions suffer from significant drawbacks related to their accuracy of returning search results and/or accuracy of ranking search results. Through their innovative endeavors, the inventors have recognized the sources of many of such drawbacks and proposed solutions that address those drawbacks.

BRIEF SUMMARY

In general, embodiments of the present invention provide methods, apparatus, systems, computing devices, computing entities, and/or the like for indexing and/or searching of documents with semantic intelligence. Certain embodiments utilize systems, methods, and computer program products that enable pre-processing of documents with semantic intelligence, searching of documents with semantic intelligence, cross-lingual searching of documents, searching of documents using distributed search systems, and/or searching of domain-specific repositories of documents such as searching of clinical documents.

In accordance with one aspect, a method is provided. In one embodiment, the method comprises performing pre-processing of each document of the plurality of documents having a plurality of words to generate an indexed representation for the document, the pre-processing of each document comprising: (i) identifying one or more sentences in the document, wherein each sentence of the one or more sentences comprises one or more words from the plurality of words in the document; (ii) determining, for each n-gram of one or more n-grams associated with the document, one or more n-gram semantic scores based at least in part on one or more semantic proximity indicators for the n-gram, wherein each n-gram of the one or more n-grams comprises a combination of one or more words from the plurality of words in the document, and wherein each semantic proximity indicator of the one or more semantic proximity indicators for an n-gram indicates a degree of semantic relatedness between a respective word of the one or more words in the n-gram and a respective candidate semantic label of one or more candidate semantic labels associated with the document; (iii) determining, based at least in part on each one or more n-gram semantic scores for an n-gram of the one or more n-grams, one or more sentence semantic labels for each sentence of the one or more sentences in the document; and (iv) determining the indexed representation for the document based at least in part on the one or more sentence semantic labels for each sentence of the one or more sentences in the document; performing the search query based at least in part on the plurality of search terms and each indexed representation associated with a document of the plurality of documents to generate a search result for the search query; and transmitting the search result to a computing device associated with the search query.

In accordance with another aspect, a computer program product is provided. The computer program product may comprise at least one computer-readable storage medium having computer-readable program code portions stored therein, the computer-readable program code portions comprising executable portions configured to perform pre-processing of each document of the plurality of documents having a plurality of words to generate an indexed representation for the document, the pre-processing of each document comprising: (i) identifying one or more sentences in the document, wherein each sentence of the one or more sentences comprises one or more words from the plurality of words in the document; (ii) determining, for each n-gram of one or more n-grams associated with the document, one or more n-gram semantic scores based at least in part on one or more semantic proximity indicators for the n-gram, wherein each n-gram of the one or more n-grams comprises a combination of one or more words from the plurality of words in the document, and wherein each semantic proximity indicator of the one or more semantic proximity indicators for an n-gram indicates a degree of semantic relatedness between a respective word of the one or more words in the n-gram and a respective candidate semantic label of one or more candidate semantic labels associated with the document; (iii) determining, based at least in part on each one or more n-gram semantic scores for an n-gram of the one or more n-grams, one or more sentence semantic labels for each sentence of the one or more sentences in the document; and (iv) determining the indexed representation for the document based at least in part on the one or more sentence semantic labels for each sentence of the one or more sentences in the document; perform the search query based at least in part on the plurality of search terms and each indexed representation associated with a document of the plurality of documents to generate a search result for the search query; and transmit the search result to a computing device associated with the search query.receives/collects an input In accordance with yet another aspect, an apparatus comprising at least one processor and at least one memory comprising computer program code is provided. In one embodiment, the at least one memory and the computer program code may be configured to, with the processor, cause the apparatus to perform pre-processing of each document of the plurality of documents having a plurality of words to generate an indexed representation for the document, the pre-processing of each document comprising: (i) identifying one or more sentences in the document, wherein each sentence of the one or more sentences comprises one or more words from the plurality of words in the document; (ii) determining, for each n-gram of one or more n-grams associated with the document, one or more n-gram semantic scores based at least in part on one or more semantic proximity indicators for the n-gram, wherein each n-gram of the one or more n-grams comprises a combination of one or more words from the plurality of words in the document, and wherein each semantic proximity indicator of the one or more semantic proximity indicators for an n-gram indicates a degree of semantic relatedness between a respective word of the one or more words in the n-gram and a respective candidate semantic label of one or more candidate semantic labels associated with the document; (iii) determining, based at least in part on each one or more n-gram semantic scores for an n-gram of the one or more n-grams, one or more sentence semantic labels for each sentence of the one or more sentences in the document; and (iv) determining the indexed representation for the document based at least in part on the one or more sentence semantic labels for each sentence of the one or more sentences in the document;

perform the search query based at least in part on the plurality of search terms and each indexed representation associated with a document of the plurality of documents to generate a search result for the search query; and transmit the search result to a computing device associated with the search query.receives/collects an input

BRIEF DESCRIPTION OF THE DRAWINGS

Figure 1:
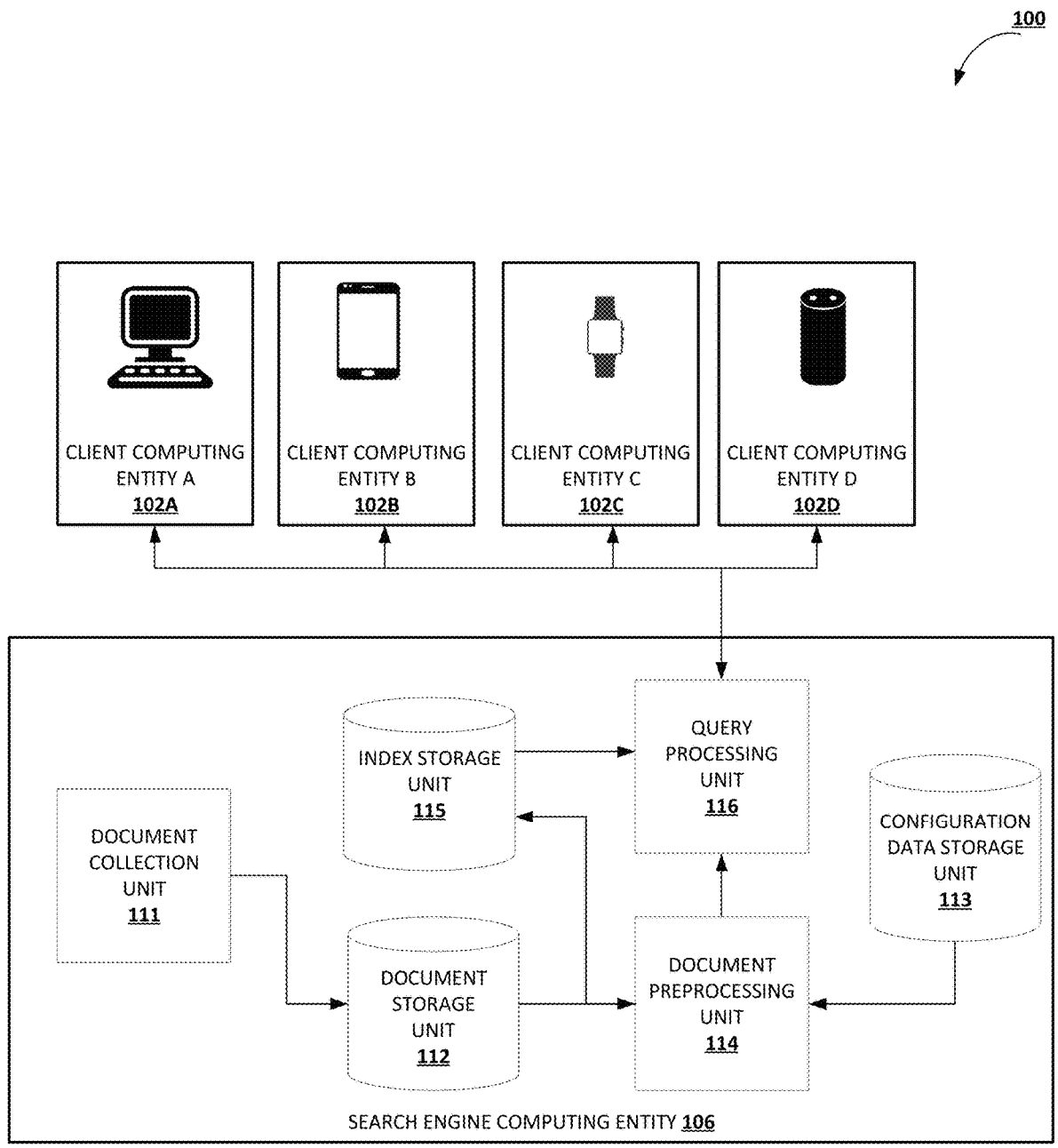

Having thus described the invention in general terms, reference will now be made to the accompanying drawings, which are not necessarily drawn to scale, and wherein:

FIG. 1 is an exemplary overview of an architecture that can be used to practice embodiments of the present invention.

Figure 2:
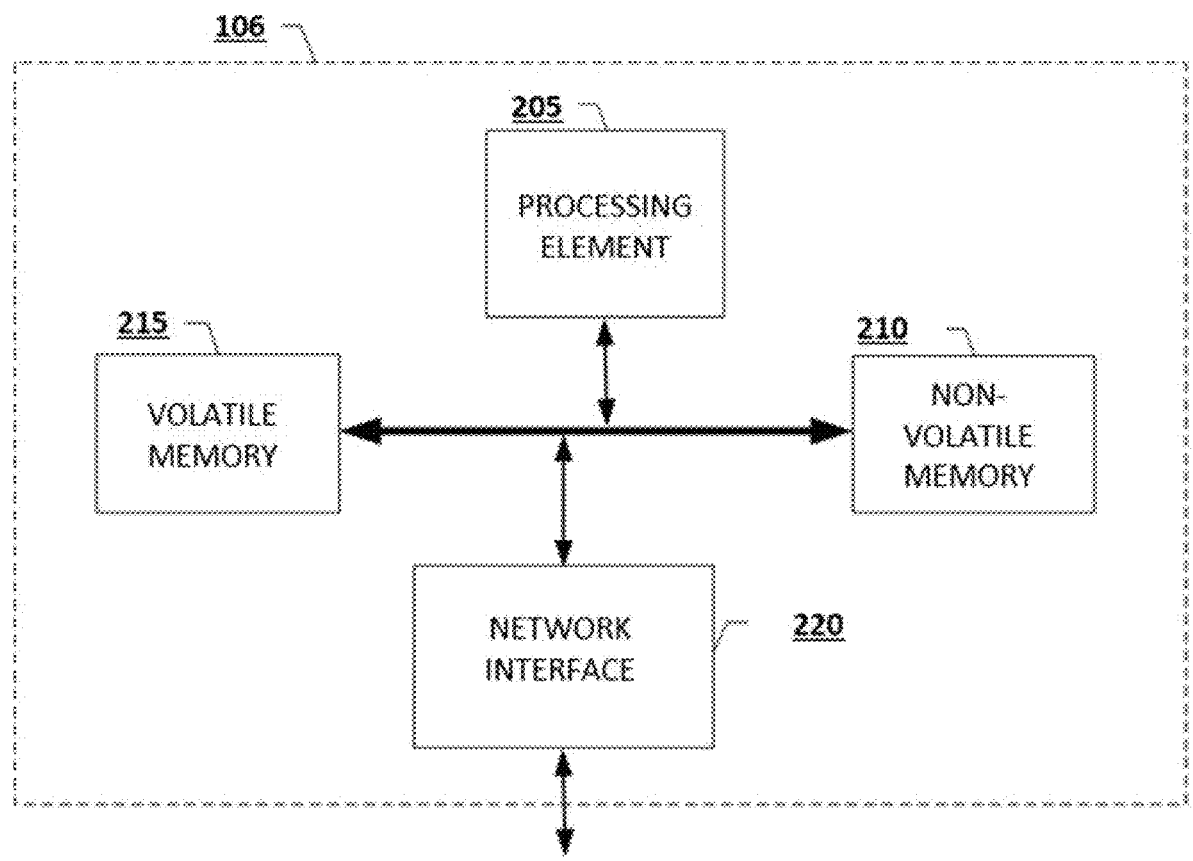

FIG. 2 illustrates an example search engine computing entity in accordance with some embodiments discussed herein.

Figure 3:
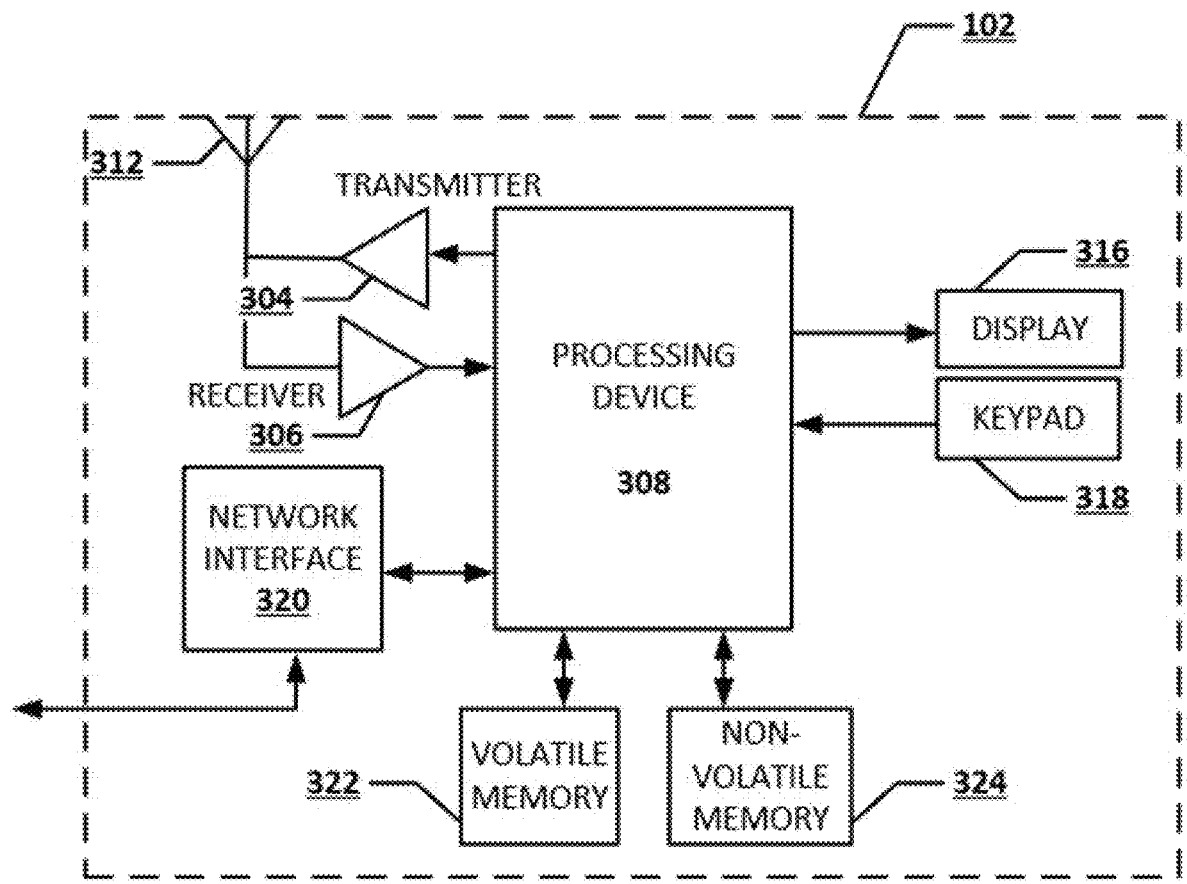

FIG. 3 illustrates an example client computing entity in accordance with some embodiments discussed herein.

Figure 4:
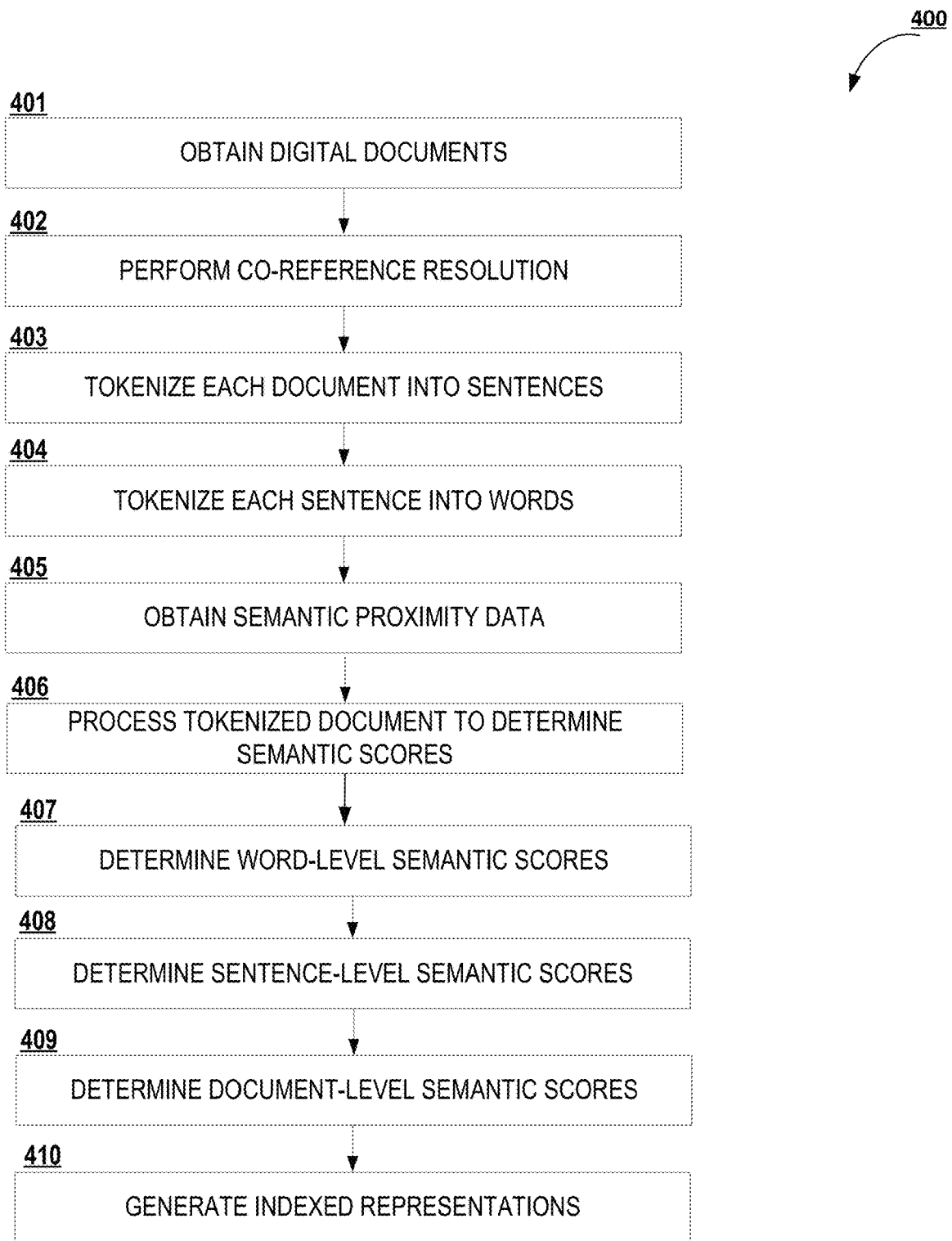

FIG. 4 depicts a flowchart diagram of an example process for generating indexed representations of documents in accordance with some embodiments discussed herein.

Figure 5:
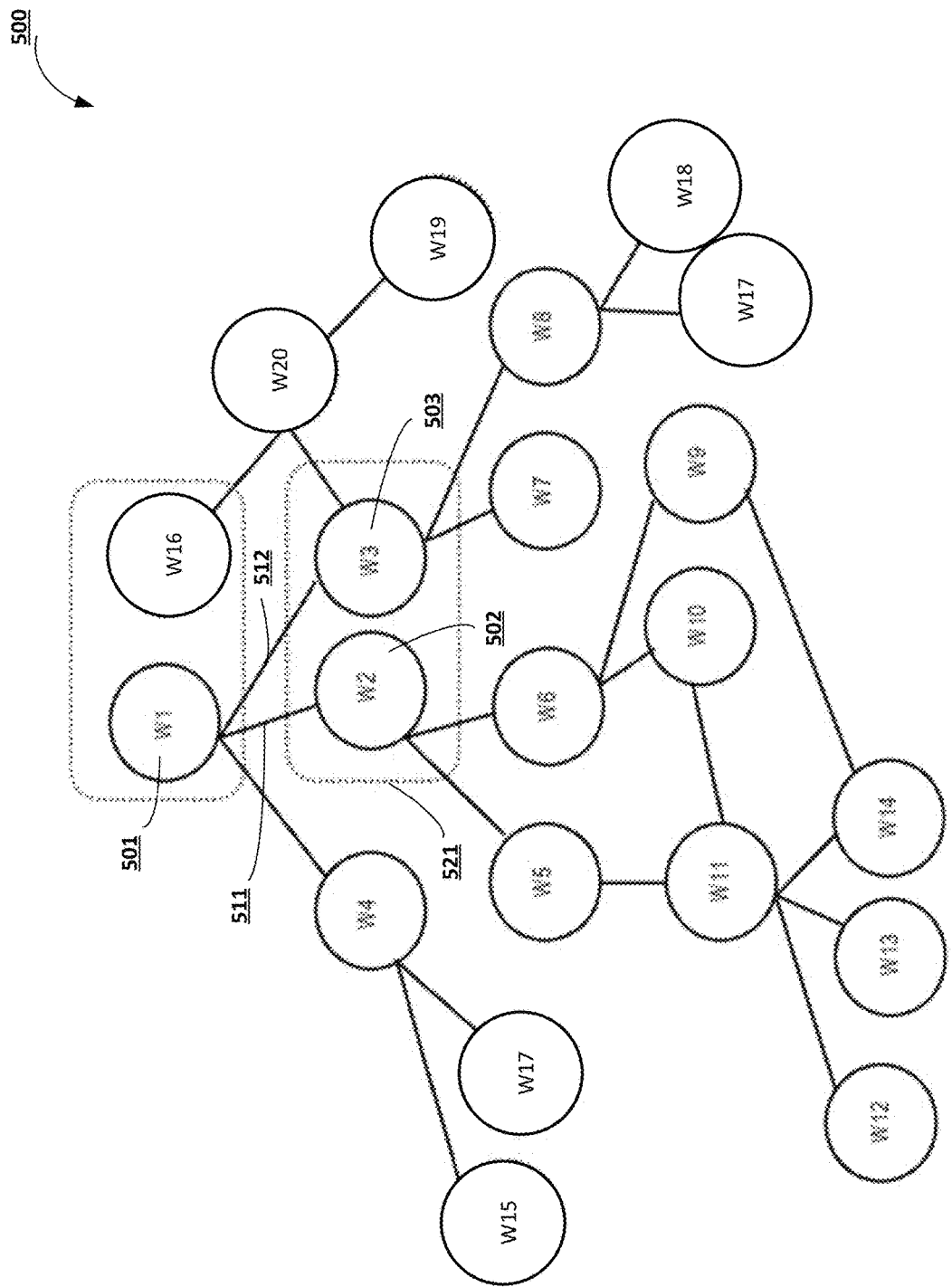

FIG. 5 provides an operational example of a semantic proximity graph in accordance with some embodiments discussed herein.

Figure 6:
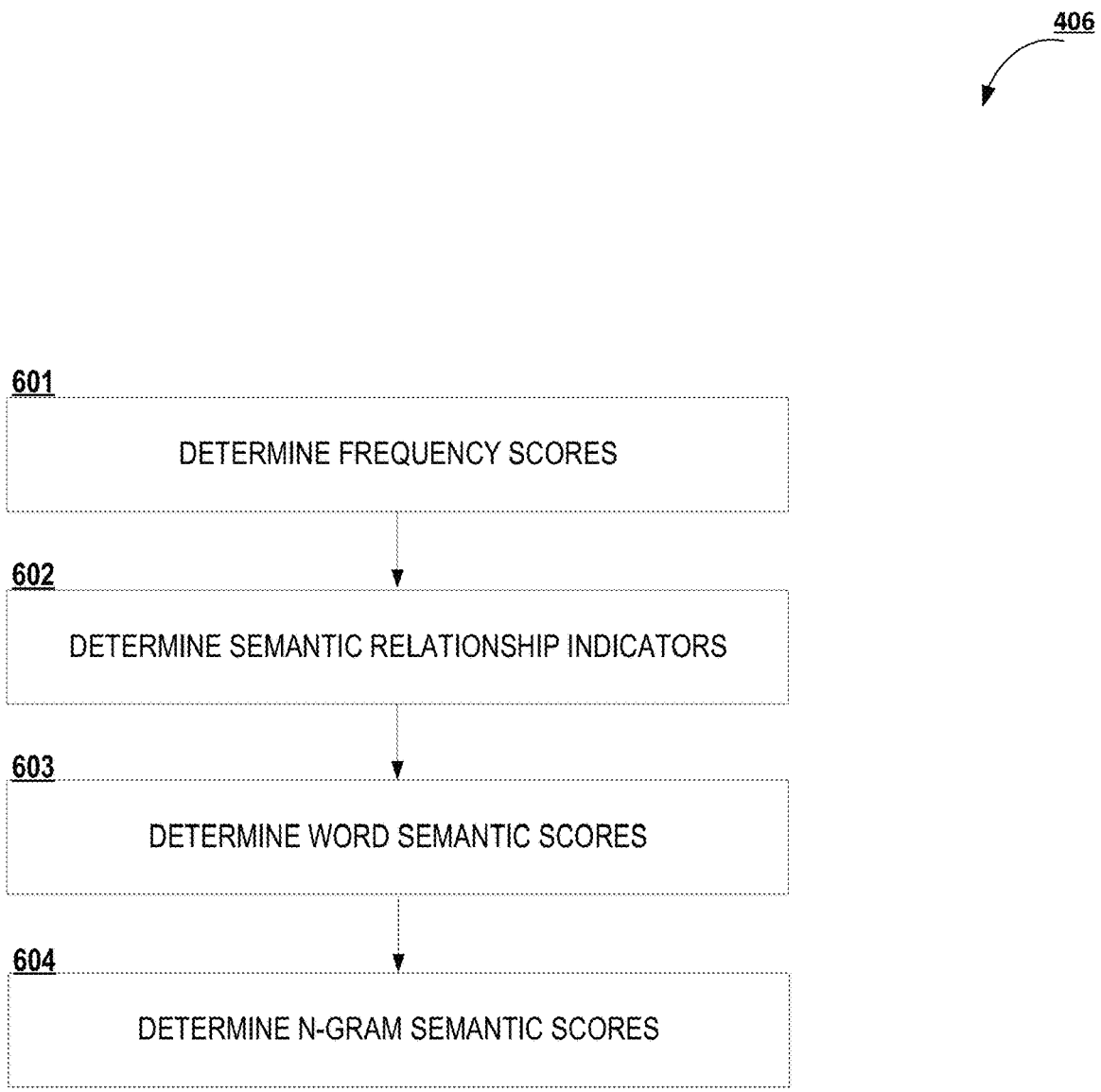

FIG. 6 depicts a flowchart diagram of an example process for generating semantic scores in accordance with some embodiments discussed herein.

FIG. 7 provides an operational example of a document in accordance with some embodiments discussed herein.

FIG. 8 provides an operational example of a frequency score data structure in accordance with some embodiments discussed herein.

Figure 9:
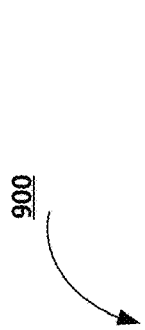

FIG. 9 provides an operational example of a semantic relationship data structure in accordance with some embodiments discussed herein.

Figure 10:

FIG. 10 provides an operational example of a semantic proximity data structure in accordance with some embodiments discussed herein.

Figures 11A, 11B:
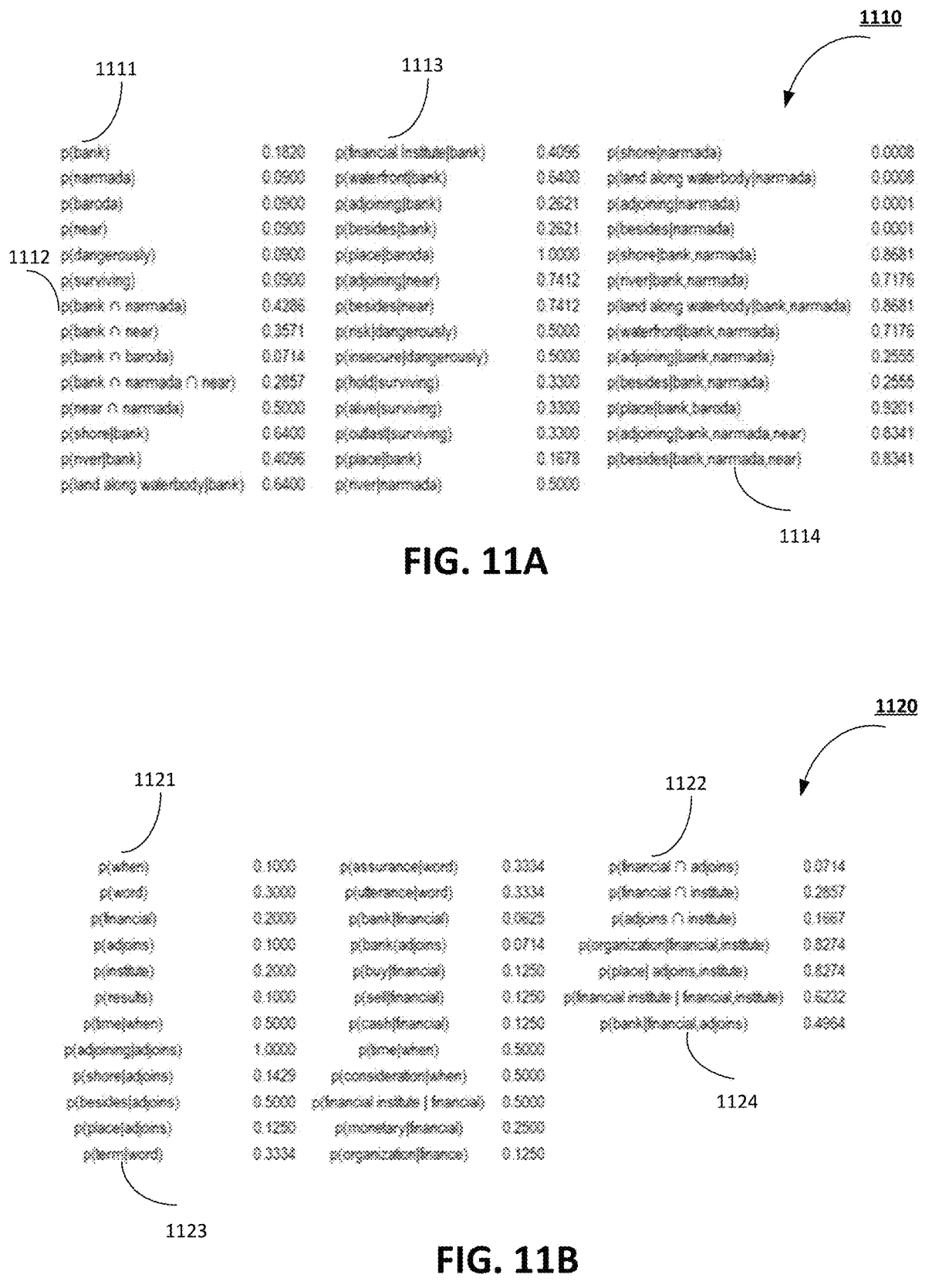

FIGS. 11A-11B provide operational examples of data structures that include frequency scores and semantic scores in accordance with some embodiments discussed herein.

Figure 12A:
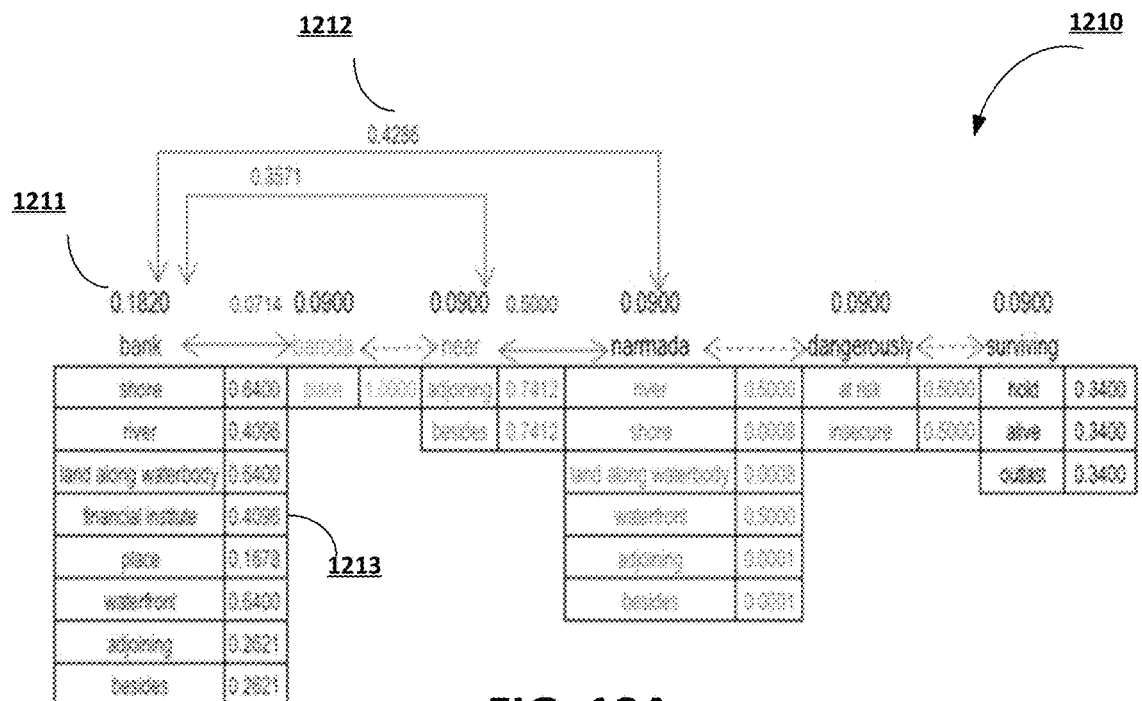
Figure 12B:
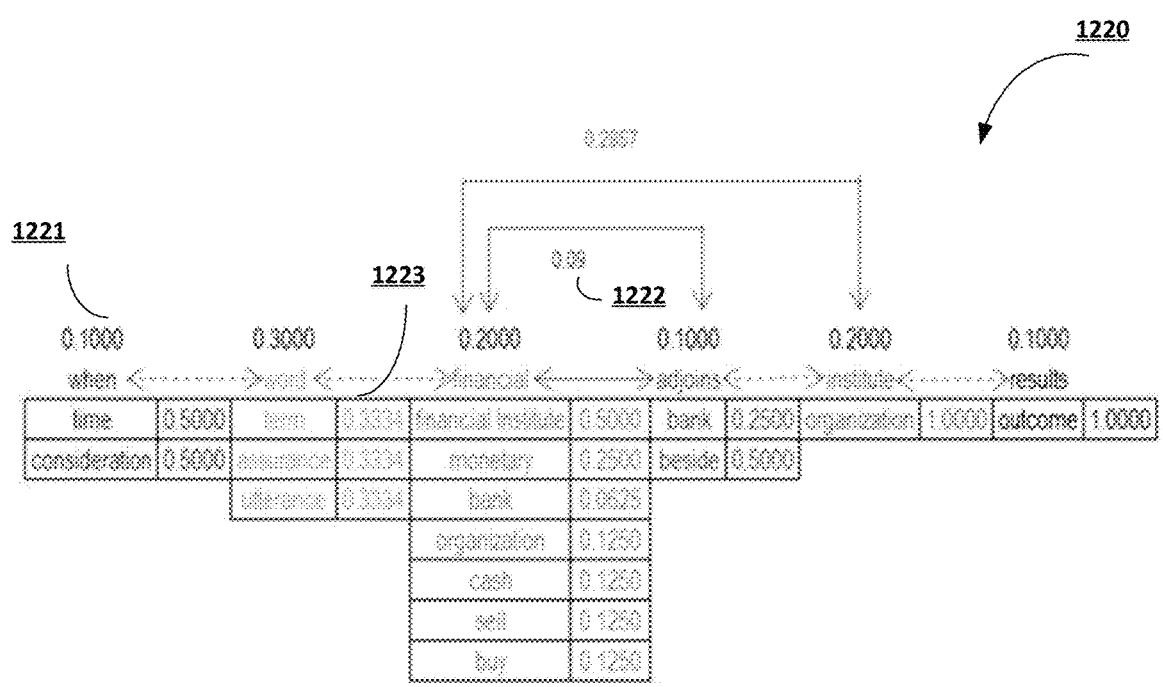
Figure 13:
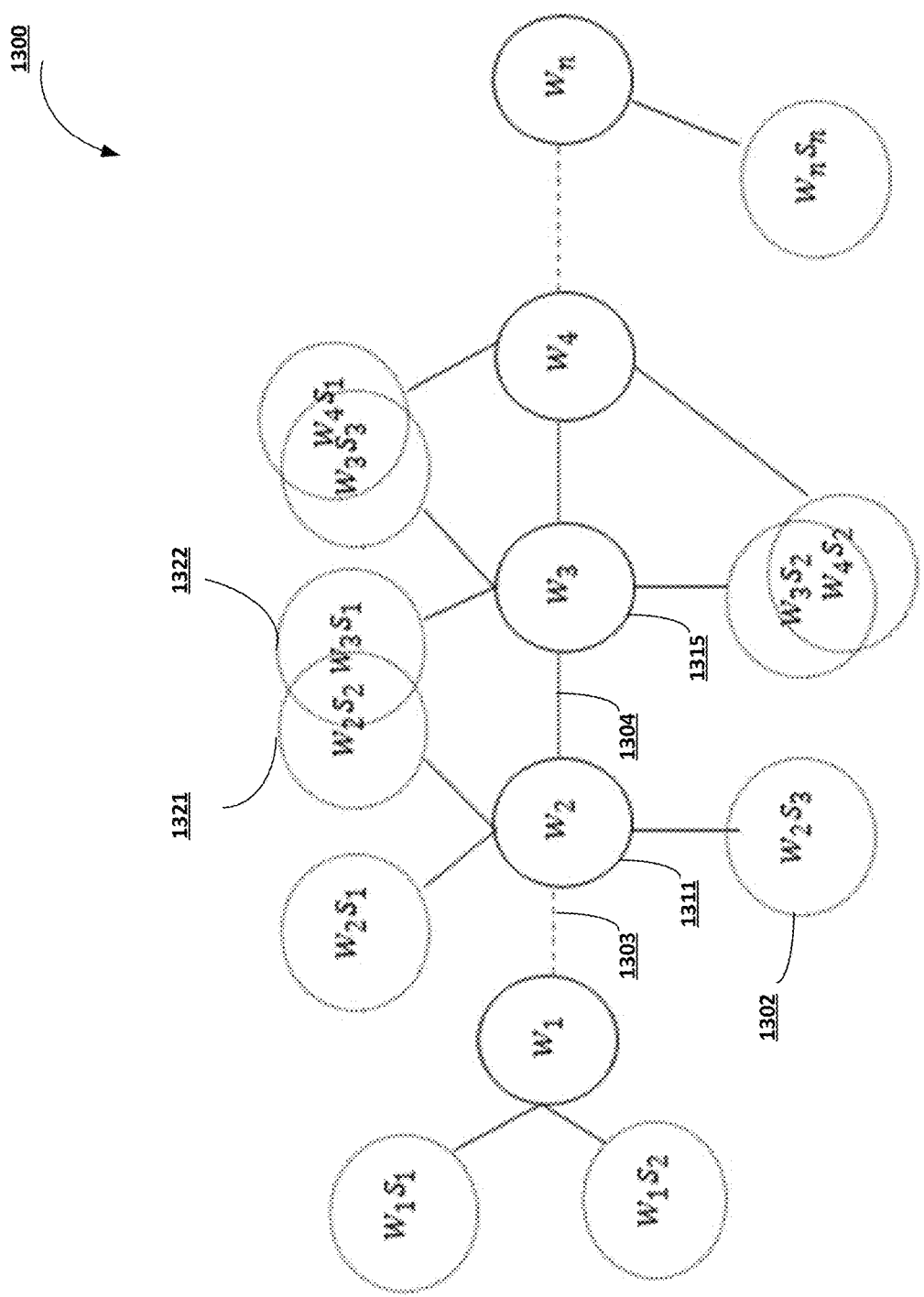

FIGS. 12A-12B and 13 provide operational examples of indexed representations of documents in accordance with some embodiments discussed herein.

Figure 14:
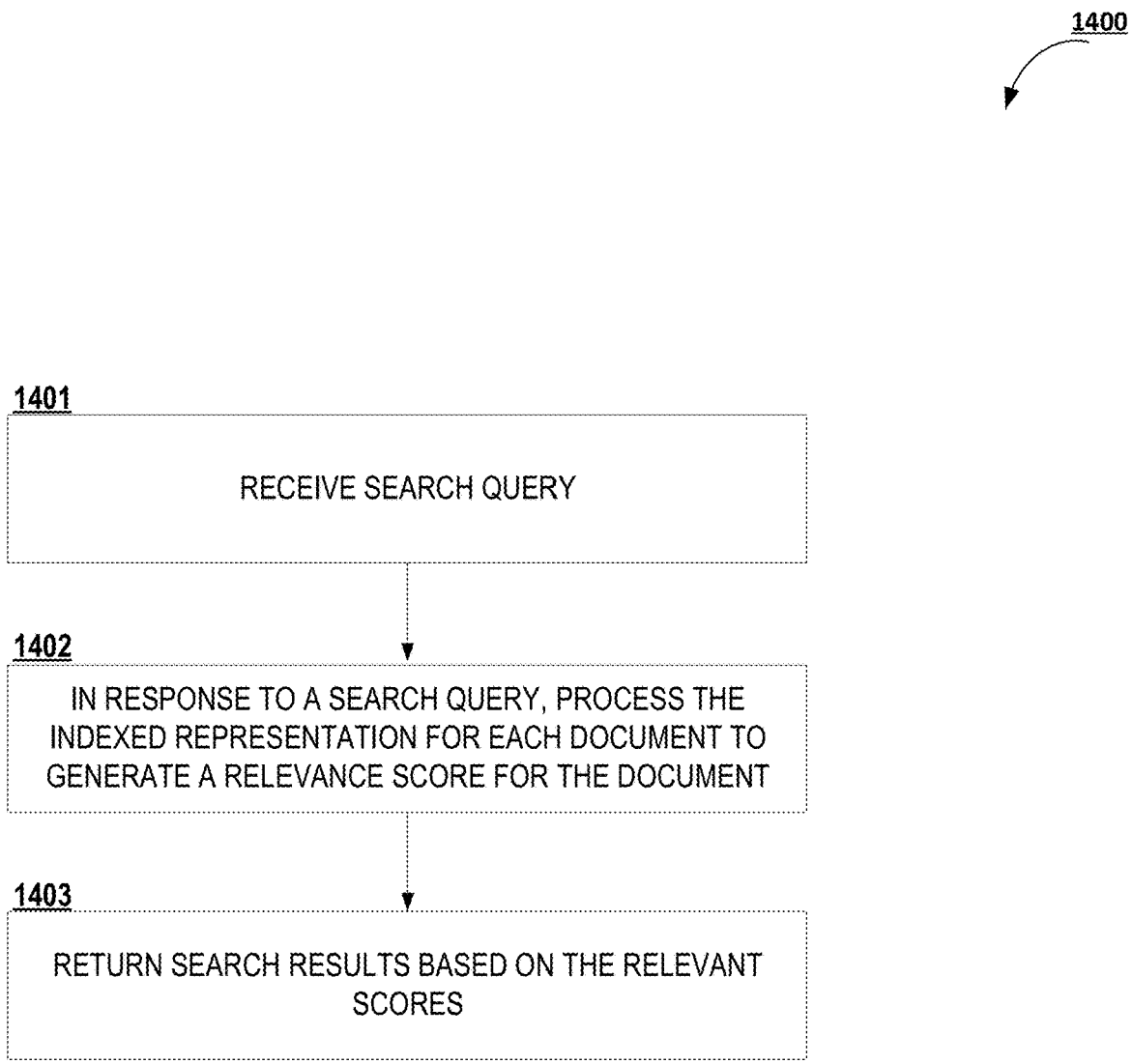

FIG. 14 depicts a flowchart diagram of an example process for performing search queries in accordance with some embodiments discussed herein.

Figure 15:
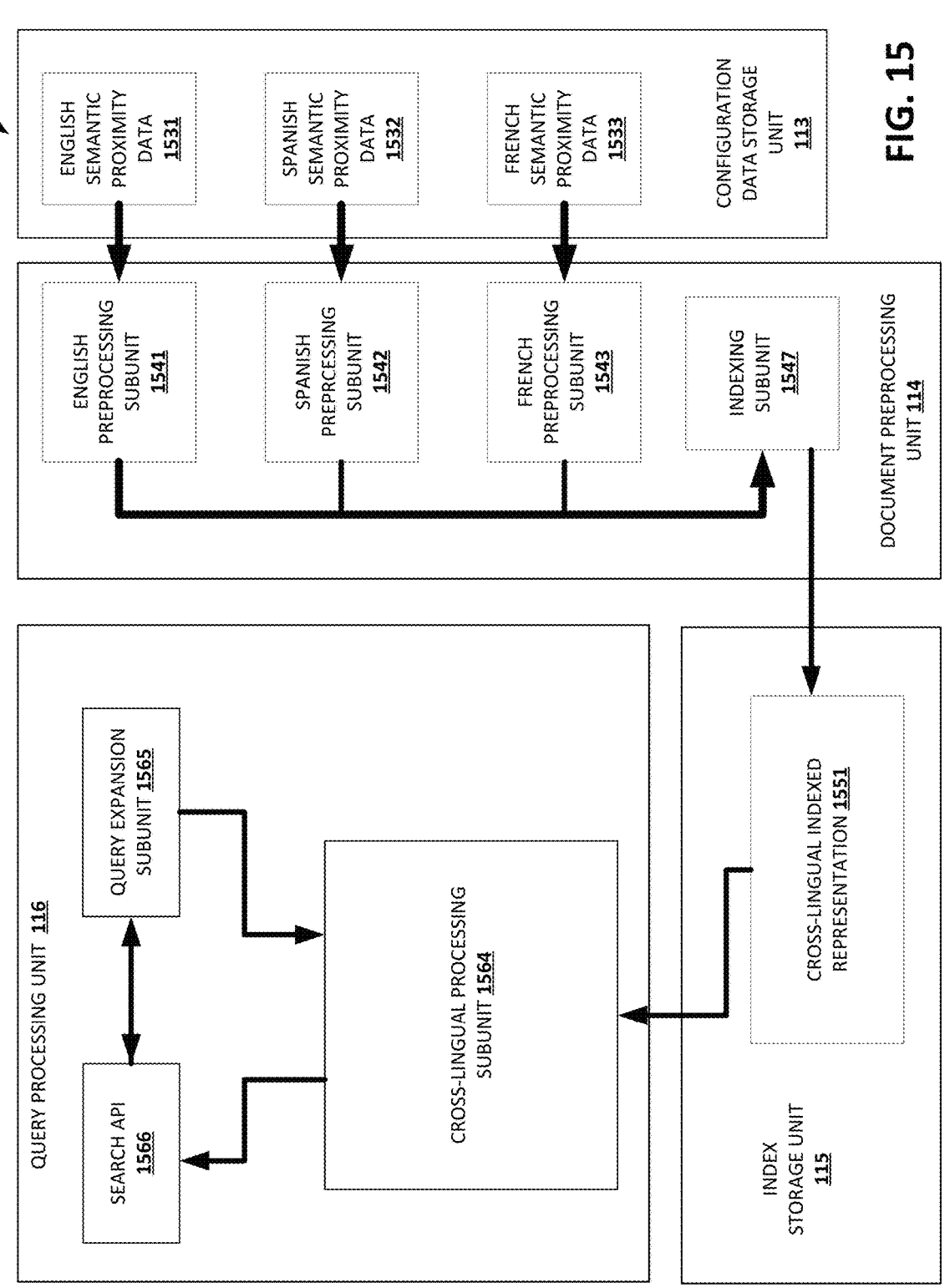

FIG. 15 depicts a data flow diagram of an example process for performing cross-lingual search queries in accordance with some embodiments discussed herein.

Figure 16:
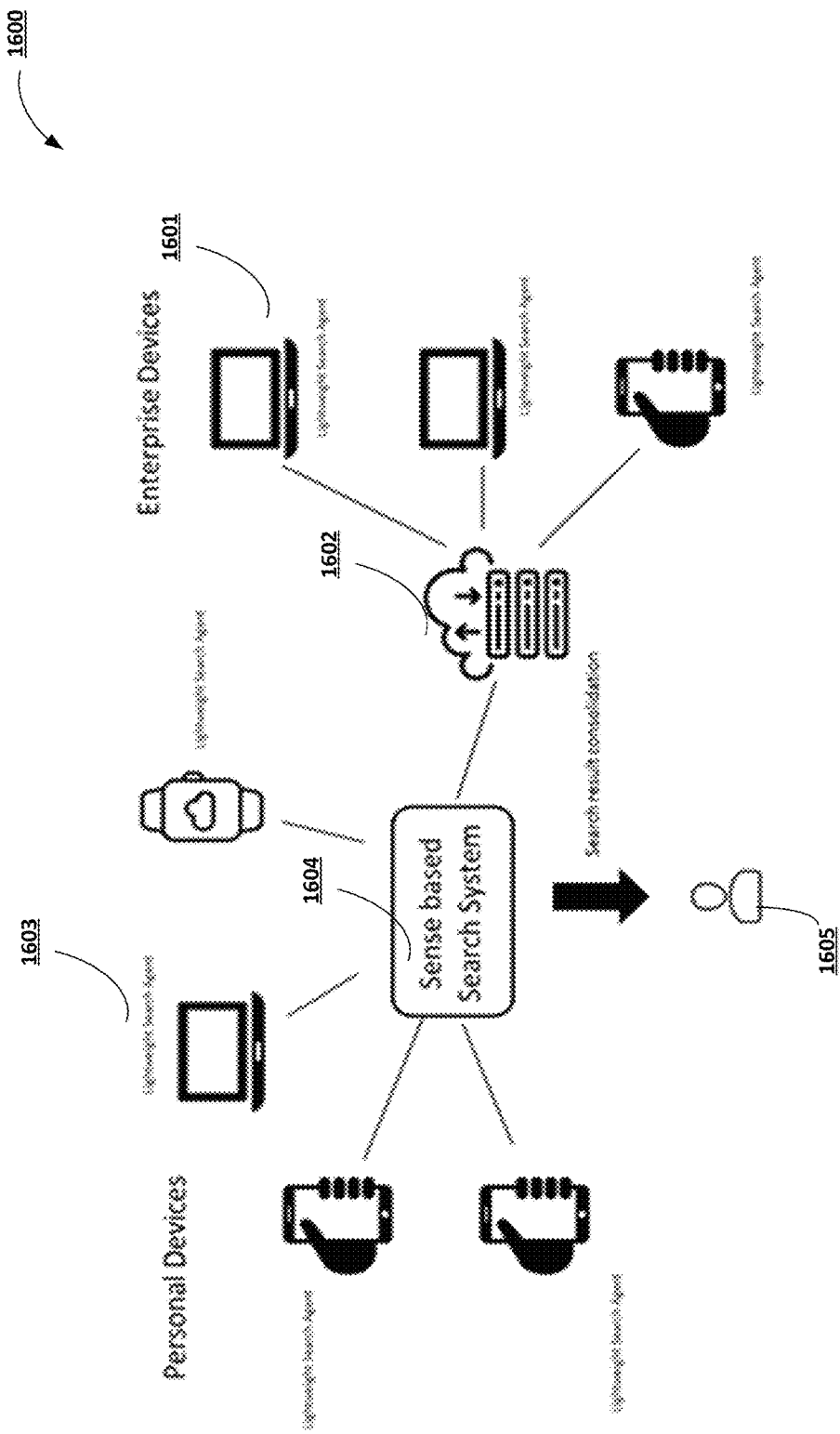

FIG. 16 provides a block diagram of an example multi-device enterprise search system in accordance with some embodiments discussed herein.

Figure 17:

FIG. 17 provides an operational example of a selectable sense search user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Discussed herein methods, apparatus, systems, computing devices, computing entities, and/or the like for pre-processing of documents with semantic intelligence, searching of documents with semantic intelligence, cross-lingual searching of documents, searching of documents using distributed search systems, and/or searching of domain-specific repositories of documents such as searching of clinical documents. As will be recognized, however, the disclosed concepts can be used to perform various types of data analysis related to documents, such as various types of natural language data analysis related to documents.

A. Technical Problems

Semantic feature extraction and word-sense disambiguation is a technical problem related to many natural language processing domains, such as to searching of documents in natural language format. The basic goal of a search system (e.g., a query-based document retrieval system) is to find documents that are relevant to a user's input query. Current techniques are often unable to find a document based at least in part on a search term if the search term (or, at best, a synonym of the search term) is not available in the document. Word sense disambiguation, i.e., the task of identifying which sense of a word is used in a sentence when the word has multiple meanings, is critical to such search systems. Word ambiguity (e.g., when one word has multiple possible meanings) is very common in language, especially for abbreviations (including both acronyms and other abbreviated words). Ambiguous words are often used to convey essential information, so correctly interpreting the meaning of an ambiguous term is important to the success of natural language processing systems such as some search systems. Consequently, automated word-sense disambiguation is a critical cornerstone for the development of high quality natural language processing systems.

Currently, many existing solutions for indexing and searching of documents do not enable effective and efficient semantic feature extraction from documents, such as effective and efficient word sense disambiguation. For example, many machine-learning based solutions require a lot of training to disambiguate words with multiple meanings. The challenges with many such solutions are two-fold: they require a lot of training data (which may be hard to find) and they are resource-inefficient. As another example, many knowledge-based solutions that rely on semantic search and extraction of knowledge graphs out of searched documents and correlating it with linked data require deep domain understanding and highly complex semantic extraction system. Systems that utilize such solutions (e.g., the Marklogic software) may be inefficient when used to process large volumes of documents. Moreover, hybrid solutions that use both machine learning and knowledge-based techniques suffer from some of the drawbacks of both techniques.

In general, many existing solutions for preprocessing and searching of documents suffer from at least three significant drawbacks: they fail to effectively infer semantic context of words and phrases in the documents, require significantly large amount of memory and/or processing resources, and fail to enable effective and efficient cross-domain (e.g., cross-lingual) searching of documents. Thus, there is a technical need for semantically intelligent and resource efficient searching solutions that enable effective and efficient cross-domain searching of documents.

For example, many existing solutions for searching of documents rely on indexed representations of documents generated primarily based at least in part on based at least in part on identified keywords in documents. In some cases, many existing solutions use frequency counts of particular words in documents and/or cosine similarities between those words in a vector space to index those documents. In this way, many existing solutions use semantically unintelligent techniques for indexing and/or searching of documents. As a result, many existing solutions fail to properly determine intended meanings of semantically ambiguous words and phrases. This undermines the accuracy of those systems and renders them especially ineffective for searching documents related to technical domains in which identical words are used to refer to various distinct entities and/or phenomena. For example, in a clinical searching context, a searching system may be deemed ineffective if it fails to properly disambiguate various uses of the word "cold" to distinguish when the word is used to denote a disease and when the word is used to denote a temperature designation.

Furthermore, many existing solutions for indexing and/or searching of documents are resource inefficient. For example, some existing solutions require a massive amount of memory and processing resources to determine cosine similarity scores. As another example, some existing solutions require a massive amount of memory and processing resources to train and/or execute neural network programs. As yet another example, some existing solutions require a massive amount of memory and processing resources to determine frequency scores across a large corpus of documents. Because of their resource inefficiencies, many existing solutions fail to enable effective and reliable searching in systems that deal with large amounts of documents and/or service a large number of users. Examples of such systems include some search systems utilized by large enterprise entities.

Moreover, many existing solutions for indexing and/or searching of documents fail to enable effective and efficient cross-domain searching of documents. For example, many existing solutions fail to enable effective and efficient searching of documents across linguistic domains in order to return documents related to a search query not only in a language of the search query but in languages other than the language of the query. As another example, in many existing solutions, a corpus of documents having multiple languages cannot be processed in a single context and using a single set of indexes without additional language-specific preprocessing, a feature that renders many existing searching solutions ineffective and/or inefficient.

B. Technical Solutions

As further discussed in this section and throughout this document, various embodiments of the present invention address technical challenges related to a need for semantically intelligent indexing and/or searching solutions. For example, various embodiments enable extracting semantic labels for words and phrases in documents based at least in part on semantic scores for those words and phrases, where the semantic scores are determined based at least in part on both frequency scores determined from the documents and data regarding semantic proximity between words in a particular domain such as a linguistic domain. As another example, various embodiments of the present invention map semantic relationships between words and phrases in documents to semantic probability distributions generated based at least in part on frequency distributions in the documents and semantic relationships in linguistic domains. Using frequency distributions of words and phrases to infer semantic labels can in turn enable determining semantic conclusions based at least in part on contexts of the word and the phrases. For example, various embodiments of the present invention teach that the use of the word "medicine" after the word "cold" in the phrase "cold medicine" may indicate that the word "cold" refers to a disease and not a temperature designation. Thus, various embodiments of the present invention address technical challenges related to a need for semantically intelligent indexing and/or searching solutions. This in turn renders those embodiments especially effective for searching documents related to technical domains in which identical words are used to refer to various distinct entities and/or phenomena, e.g., for clinical searching.

Furthermore, as further discussed in this section and throughout this document, various embodiments of the present invention address technical challenges related to resource efficiency of indexing and/or searching systems. For example, various embodiments of the present invention reduce memory requirements for indexing and/or searching systems by storing semantic proximity data in low-cost data structures, such as using undirected graphs that can store semantic relationships between a large number of words in relatively small data segments (e.g., semantic relationships between around 0.17 million English words can be stored in a 2 to 3 megabyte file). As another example, various embodiments reduce processing requirements for indexing and/or searching systems by enabling retrieving semantically proximity data in constant or linear time, e.g., by traversing an undirected semantically proximity graph. As yet another example, various embodiments of the present invention enable determining frequency scores based at least in part on occurrence frequencies of words in single documents, without the need for determining frequency scores across a large corpus of documents (as required by many term frequency-inverse document frequency algorithms). Thus, various embodiments of the present invention address technical challenges related to resource efficiency of indexing and/or searching systems. In this way, various embodiments of the present invention enable distributed indexing and/or searching of documents, e.g., distributed indexing and/or searching of documents in large enterprise systems.

Moreover, as further discussed in this section and throughout this document, various embodiments of the present invention address technical challenges related to a need for effective and efficient cross-domain indexing and/or searching of documents. For example, as further described below in relation to FIG. 15, various embodiments enable generating cross-lingual indexed representations of documents that can be used to perform effective and efficient cross-lingual searching. To perform cross-lingual searching, various embodiments use memory-efficient domain-specific semantic proximity data to calculate domain-specific semantic scores, which in turn are used to determine an aggregate cross-lingual semantic score for each document in relation a particular search query. In this way, various embodiments of the present invention enable indexing and/or searching a corpus of documents with multiple languages in a single context and using cross-lingual indexed representations of documents. Thus, various embodiments of the present invention address technical challenges related to a need for effective and efficient cross-domain searching, e.g., effective and efficient searching across multiple linguistic domains.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is an exemplary overview of an architecture 100 that can be used to practice embodiments of the present invention. The architecture 100 includes one or more client computing entities 102A-D, such as a client computing entity A 102A, a client computing entity B 102B, a client computing entity C 102C, and a client computing entity D 102D. Client computing entities 102A-D interact with a search engine computing entity 106 via a communication network (not shown). The search engine computing entity 106 includes a document collection unit 111, a document preprocessing unit 114, a query processing unit 116, and multiple storage units such as a document storage unit 112, a configuration data storage unit 113, and an index storage unit 115. Each computing entity in the architecture 100 may include one or more of any suitable network server and/or other type of processing device. The communication network (not shown) may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). Each storage unit may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In various embodiments, a storage unit may be configured to store a database, such as a relational database.

The architecture 100 is configured to enable indexing one or more documents, searching the documents in response to search queries by the client computing entities 102A-D, and providing search results to the client computing entities 102A-D for presentation to users of those client computing entities 102A-D. In some embodiments, the query processing unit 116 of the search engine computing entity 106 is configured to receive search queries from query-initiating client computing entities 102A-D, determine which documents stored by the document collection unit 111 in the document storage unit 112 correspond to each search query based at least in part on the indexed representations of the documents generated by the document preprocessing unit 114 using configuration data in the configuration data storage unit 113 and stored by the document preprocessing unit 114 in the index storage unit 115, and transmit data with indications of the determined documents for each search query to the query-initiating client computing entity 102A-D.

The document collection unit 111 is configured to generate and/or collect one or more documents for storage in the document collection unit 111. For example, the document collection unit 111 may collect the documents by retrieving documents from one or more external computing entities and/or from one or more databases. The document collection unit 111 may be a crawler software that crawls documents from one or more server computing entities hosting those documents. The document collection unit 111 is further configured to store documents in the document storage unit 112, which is in turn configured to store documents. For example, the document collection unit 111 may be configured to store documents in the document storage unit 112 in a compressed form. As another example, the document collection unit 111 may be configure to store documents in the document storage unit 112 in an uncompressed form.

The document preprocessing unit 114 is configured to retrieve documents from the document storage unit 112, process the retrieved documents in accordance with configuration data stored in the configuration data storage unit 113 to generate an indexed representation of each document, and store the generated indexed representations in the index storage unit 115. In some embodiments, the document preprocessing unit 114 generates an indexed representation of each document based at least in part on one or more of frequency scores and semantic scores associated with one or more n-grams extracted from the document, where an n-gram may a permutation of one or more words from the document. The document preprocessing unit 114 may use various types of configuration data in processing documents to generate indexed representations. For example, the document preprocessing unit 114 may use configuration data in the form of semantic proximity data and/or configuration data defining a maximum size for n-grams generated from documents. In some embodiments, if the documents are in compressed form, the document preprocessing unit 114 is configured to decompress those documents prior to processing those documents to generate indexed representation.

The query processing unit 116 is configured to receive search queries from client computing entities 102A-D, determine results for search queries based at least in part on indexed representations of documents stored in the index storage unit 115, and provide the results for search queries to the client computing entities 102A-D. The results for search queries may include indications of (e.g., identifiers of and/or references to) one or more documents stored in the document storage unit 112. In some embodiments, the query processing unit 116 is configured to expand a search query by adding new search terms deemed semantically related to and/or semantically equivalent to the initial search terms for a search query. For example, the query processing unit 116 may be configured to enable cross-lingual searching, in the manner described in greater detail below with reference to FIG. 15.

A. Exemplary Search Engine Computing Entity

FIG. 2 provides a schematic of a search engine computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the search engine computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the search engine computing entity 106 may include or be in communication with one or more processing elements 205 (also referred to as processors, processing circuitry, and/or similar terms used herein interchangeably) that communicate with other elements within the search engine computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the search engine computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, object model, semantic model, graph model, and/or the like.

In one embodiment, the search engine computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the search engine computing entity 106 with the assistance of the processing element 205 and operating system.

As indicated, in one embodiment, the search engine computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the search engine computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the search engine computing entity 106 may include or be in communication with one or more input elements, such as a keyboard input, a mouse input, a touch screen/display input, motion input, movement input, audio input, pointing device input, joystick input, keypad input, and/or the like. The search engine computing entity 106 may also include or be in communication with one or more output elements (not shown), such as audio output, video output, screen/display output, motion output, movement output, and/or the like.

As will be appreciated, one or more of the search engine computing entity's 106 components may be located remotely from other search engine computing entity 106 components, such as in a distributed system. Furthermore, one or more of the components may be combined and additional components performing functions described herein may be included in the search engine computing entity 106. Thus, the search engine computing entity 106 can be adapted to accommodate a variety of needs and circumstances. As will be recognized, these architectures and descriptions are provided for exemplary purposes only and are not limiting to the various embodiments.

B. Exemplary Client Computing Entity

FIG. 3 provides an illustrative schematic representative of a client computing entity 102A-D that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102A-D can be operated by various parties. As shown in FIG. 3, the client computing entity 102A-D can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the client computing entity 102A-D may be capable of operating with one or more air interface standards, communication protocols, modulation types, and access types. More particularly, the client computing entity 102A-D may operate in accordance with any of a number of wireless communication standards and protocols, such as those described above with regard to the search engine computing entity 106. In a particular embodiment, the client computing entity 102A-D may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102A-D may operate in accordance with multiple wired communication standards and protocols, such as those described above with regard to the search engine computing entity 106 via a network interface 320.

Via these communication standards and protocols, the client computing entity 102A-D can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102A-D can also download changes, add-ons, and updates, for instance, to its firmware, software (e.g., including executable instructions, applications, program modules), and operating system.

According to one embodiment, the client computing entity 102A-D may include location determining aspects, devices, modules, functionalities, and/or similar words used herein interchangeably. For example, the client computing entity 102A-D may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the client computing entity 102A-D may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102A-D may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102A-D to interact with and/or cause display of information from the search engine computing entity 106, as described herein.

The user input interface can comprise any of a number of devices or interfaces allowing the client computing entity 102A-D to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102A-D and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102A-D can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102A-D. As indicated, this may include a user application that is resident on the entity or accessible through a browser or other user interface for communicating with the search engine computing entity 106 and/or various other computing entities.

In another embodiment, the client computing entity 102A-D may include one or more components or functionality that are the same or similar to those of the search engine computing entity 106, as described in greater detail above. As will be recognized, these architectures and descriptions are provided for exemplary purposes only and are not limiting to the various embodiments.

IV. Exemplary System Operation

Various embodiments of the present invention provide solutions for pre-processing of documents with semantic intelligence, searching of documents with semantic intelligence, cross-lingual searching of documents, searching of documents using distributed search systems, and/or searching of domain-specific repositories of documents such as searching of clinical documents. Many of those embodiments address technical challenges related to inadequate semantic intelligence, resource efficiency, and/or cross-domain capability of many existing solutions for indexing and/or searching of documents.

A. Document Preprocessing

FIG. 4 depicts a flow diagram of an example process 400 for generating indexed representations of documents. A computing entity (e.g., the search engine computing entity 106 of FIG. 1) may utilize the various steps/operations of FIG. 4 to generate indexed representations for each document in a set of documents based both on occurrence frequency of various n-grams (e.g., ordered combinations of one or more words) in the particular document and on semantic properties of those various n-grams.

Process 400 begins at step/operation 401 by obtaining a set of one or more documents. The set of documents may include medical records, transactional records, financial records, and/or records maintained by an enterprise entity. In some embodiments, the document collection unit 111 (e.g., a web crawler and/or a database management system) retrieves the set of documents from one or more data sources internal or external to the search engine computing entity 106 and stores the set of documents in the document storage unit 112. In some embodiments, the document preprocessing unit 114 retrieves the set of documents from the document storage unit 112.

In some embodiments, a document may include any collection of one or more data items. In some embodiments, a document includes a string of alphanumeric characters (including, for example, one or more whitespace characters, one or more punctuation-mark characters, and/or one or more symbol characters). For example, the alphanumeric characters may include all of the characters whose encoding is governed by at least one character encoding scheme, such as the American Standard Code for Information Exchange (ASCII) character encoding scheme and/or the Universal Coded Character Set (UCS or Unicode) character encoding scheme.

At step/operation 402, the document preprocessing unit 114 performs co-reference resolution on the set of documents. To perform co-reference resolution on the set of documents, the document preprocessing unit 114 may utilize one or more machine learning modules, such as one or more machine learning modules configured to perform natural language processing. For example, the document preprocessing unit 114 may utilize machine learning frameworks that use one or more of support vector machines, neural networks (including feed-forward neural networks and/or recurrent neural networks), maximum entropy classifiers, etc. In some embodiments, the document preprocessing unit 114 may utilize one or more existing co-reference resolution software solutions, such as CoreNLP, Reconcile, GuiTAR, Illinois Conference Package, CherryPicker, OpenNLP, ARKref, etc.

In some embodiments, to perform co-reference resolution on a document, the document preprocessing unit 114 replaces each of at least some of two or more n-grams in a document that refer to a common entity and/or phenomenon with a descriptive n-gram that refers to the common entity and/or phenomenon. For example, the document preprocessing unit 114 may process a document to replace an initial sentence "Harry told me to call him" in the document with a transformed sentence "Harry told me to call Harry." To perform the noted transformation, the document preprocessing unit 114 may first detect (e.g., using one or more natural language processing (NLP) modules) that the co-referencing n-gram "Harry" and the co-referencing n-gram "him" in the initial sentence both refer to a common entity.receives/collects an input In response to the noted detection, the document preprocessing unit 114 may determine that "Harry" is a more descriptive n-gram for the common entity, and thus replace the co-referencing n-gram "him" with the co-referencing n-gram "Harry" in the initial sentence to generate the transformed sentence.

As another example, the document preprocessing unit 114 may process a document to replace an initial sentence "David said he hurt his knee" with a transformed sentence "David said David hurt David's knee." To perform the noted transformation, the document preprocessing unit 114 may first detect that the n-grams "David," "he," and "his" in the initial sentence refer to a common entity. In response to the noted detection, the document preprocessing unit 114 may determine that "David" and "David's" are suitable descriptive n-grams for the common entity to replace the co-referencing n-grams "he" and "his" respectively. Thereafter, the document preprocessing unit 114 may replace the n-gram "he" in the initial sentence with the n-gram "David" and the n-gram "his" in the initial sentence with the n-gram "David's" to generate the transformed sentence.

In some embodiments, if the document preprocessing unit 114 detects that m n-grams in one or more documents refer to a common entity and/or phenomenon, the document preprocessing unit 114 determines one or more descriptive n-grams for the common entity and/or phenomenon. The document preprocessing unit 114 then transforms the one or more documents to ensure that each occurrence of the m n-grams reflects one of the one or more descriptive n-grams. For example, if the sole descriptive n-gram for the common entity and/or phenomenon is one of the m n-grams, the document preprocessing unit 114 may replace all of occurrences of the m n-grams with the exception of the occurrences of the descriptive n-gram with the descriptive n-gram. As another example, if the sole descriptive n-gram for the common entity and/or phenomenon is not one of the m n-grams, the document preprocessing unit 114 may replace all occurrence of the m n-grams without exception with the descriptive n-gram.

By performing co-reference resolution, the document preprocessing unit 114 may determine n-gram frequency values that are more reflective of document semantic structures. For example, without co-reference resolution, the document preprocessing unit 114 may conclude that the sentence "David said he hurt his knee" includes one occurrence of the n-gram "David," one occurrence of the n-gram "he," and one occurrence of the n-gram "his." Because "he" and "his" are commonly used n-grams, their respective individual frequencies may have relatively less significance in determining semantic properties of particular documents. In contrast, the cumulative frequency of the n-gram "David" (i.e., three), which is a proper noun, may have considerably more significance in determining semantic properties of particular documents. Thus, by improving extraction of semantic features from documents by the document preprocessing unit 114, performing co-reference resolution may improve the quality of document indexes generated based at least in part on semantic features, such as the document indexes generated by various embodiments of the process 400.

At step/operation 403, the document preprocessing unit 114 tokenizes each document of the set of documents into one or more sentences. In some embodiments, to tokenize a document into one or more sentences, the document preprocessing unit 114 uses one or more tokenizer software solutions, such as Stanford Tokenizer, OpenNLP, Custom Tokenizer, etc. In some embodiments, to tokenize a document into one or more sentences, the document preprocessing unit 114 may divide the text data associated with the document into one or more portions, where each portion includes a collection of data designated to be a sentence by the presence of one or more preconfigured alphanumeric patterns. For example, in some embodiments, the document preprocessing 114 may determine that the presence of m words between two periods indicates that the m words form a sentence if m exceeds a threshold value. In some embodiments, the document preprocessing unit 114 tokenizes a document into sentences by generating sentences that include a combination of up to and including m consecutive words in a document, where each word in the document is associated with one sentence. In this way, tokenizing a document into sentences may corresponding to dividing the words in a document into one or more groups of equal size, where there is a one-to-many relationship between the words and sentences.

At step/operation 404, the document preprocessing unit 114 tokenizes each sentence generated in step/operation 404 into one or more words. In some embodiments, to tokenize a sentence from a document into one or more words, the document preprocessing unit 114 uses one or more tokenizer software solutions, such as Stanford Tokenizer, OpenNLP, Custom Tokenizer, etc. In some embodiments, the document preprocessing unit 114 may detect words within a sentence based at least in part on presence of one or more preconfigured characters around the word, such as a whitespace character. In some embodiments, by performing the steps/operations 403-404, the document preprocessing unit 114 generates a tokenized representation for each document, where the tokenized representation for a particular document may define one or more sentences associated with the document, one or more words associated with the document, and the association relationships between the one or more sentences and the one or more words.

At step/operation 405, the document preprocessing unit 114 obtains semantic proximity data associated with a group of semantic constructs (e.g., a group of n-grams). In some embodiments, the document preprocessing unit 114 obtains semantic proximity data from the configuration data storage unit 113. In some embodiments, the semantic proximity data indicate semantic proximity relationships of various types between a groups of one or more n-grams, where the particular type of a semantic proximity relationship may indicate a degree of semantic relatedness between the n-grams associated with the semantic proximity relationships having the particular type. For example, the semantic proximity data may indicate a first n-gram of the group of n-grams has a semantic relationship of a semantic relationship type deemed strongest (e.g., a semantic equivalency relationship) with a second n-gram of the group of n-grams and a third n-gram of the group of n-grams, but that the second n-grams and the third n-gram do not have a semantic relationship of a semantic relationship type deemed strongest with each other. In this way, the semantic proximity relationship data may further indicate that the second n-gram and the third n-gram have a semantic relationship of a semantic relationship type deemed second-strongest.

In some embodiments, aspects of semantic proximity data are depicted in FIG. 5, which provides an operational example of a semantic proximity graph 500. The semantic proximity graph 500 is an undirected graph including various nodes (e.g., nodes 501, 502, and 503) as well as various edges between the nodes (e.g., the edge 511 between the nodes 501 and 502 and the edge 512 between the nodes 501 and 504). In the semantic proximity graph 500, a node corresponds to a semantic construct, where the semantic constructs may include n-grams (e.g., words), such as n-grams associated with a particular linguistic and/or technical domain (e.g., English n-grams, n-grams related to medicine, etc.). receives/collects an input In some embodiments, the set of all n-grams associated with the semantic proximity graph 500 include combinations of one or more words detected in step/operation 404.

Moreover, in the semantic proximity graph 500 of FIG. 5, each edge between two nodes in the semantic proximity graph 500 corresponds to a semantic relationship of a semantic relationship type deemed strongest between the n-grams corresponding to the two nodes. For example, if a particular domain of n-grams includes the n-grams "bank," "financial institution," "shore", and "river," the semantic proximity graph 500 for the particular domain may include edges between nodes corresponding to the following pairs of n-grams: "bank" and "financial institution"; "bank" and "shore"; and "shore" and "river."

Thus, the document preprocessing unit 114 may utilize degrees of relationships between nodes in the semantic dependency graph 500 of FIG. 5 to determine semantic proximity indicators between particular n-grams corresponding to particular nodes modeled by the semantic proximity graph 500, e.g., measures of strength of semantic relationships between particular pairs of n-grams. In this way, a first-degree connection between two nodes in the semantic proximity graph 500 (e.g., the connection between node 501 corresponding to n-gram W1 and node 502 corresponding to n-gram W2 indicated by edge 511, or the connection between node 501 corresponding to the n-gram W1 and node 503 corresponding to n-gram W3 indicated by edge 512) represents a semantic relationship of a semantic relationship type deemed strongest between the n-grams corresponding to the two nodes. Moreover, a second-degree connection between two nodes (e.g., the connection between the node 502 corresponding to the n-gram W2 and the node 503 corresponding to the n-gram W3 indicated by combination of edges 511 and 512) represents a semantic relationship of a semantic relationship type deemed second-strongest between the n-grams corresponding to the two nodes. Thus, the semantic proximity graph 500 indicates that n-grams W1 and W2 have a strongest-type semantic relationship, n-grams W1 and W3 have a strongest-type semantic relationship, and n-grams W2 and W3 have a second-strongest-type semantic relationship.

At step/operation 406, the document preprocessing unit 114 processes the tokenized document generated in step/operation 404 in accordance with the semantic proximity data obtained in step/operation 405 to determine document semantic scores for each document of the set of documents obtained in step/operation 401. In some embodiments, the document preprocessing unit 114 determines document semantic scores for a particular document based at least in part on an n-gram semantic score for each n-gram of one or more n-grams associated with the particular document. In some embodiments, the document preprocessing unit 114 determines an n-gram semantic score for each n-gram in a document based at least in part on one or more semantic proximity indicators for the n-gram, where each semantic proximity indicator of the one or more semantic proximity indicators for an n-gram indicates a degree of semantic relatedness between a respective word of the one or more words in the n-gram and a respective candidate semantic label of one or more candidate semantic labels associated with the document, and where the degree of semantic relatedness is determined based at least in part on the semantic proximity data. In some embodiments, an n-gram semantic score for a pair of an n-gram and a candidate semantic label indicates an estimated likelihood that the n-gram relates to the candidate semantic label. For example, an n-gram semantic score may indicate the likelihood that the n-gram "bank near narmada" relates to the candidate semantic label "place." In some embodiments, such a semantic score may be denoted by the notation p(besides-|bank,narmada,near).

In some embodiments, performing the step/operation 406 for each document includes performing the process depicted in FIG. 6. The process of FIG. 6 begins at step/operation 601 by determining frequency scores for one or more n-grams associated with the document. In some embodiments, the document preprocessing unit 114 identifies one or more n-grams from the document and determines a frequency score for each n-gram.

In some embodiments, given a document that includes an ordered combination of multiple words, the document preprocessing unit 114 identifies permutations of m or fewer words from the multiple words as the n-grams for the document, where the m may be designated by the configuration data in the configuration data storage unit 113 (e.g., based at least in part on factors such as desired system efficiency, desired system accuracy, etc.). For example, if a document includes an ordered combination of three words indicated by W1→W2→W3 and m=2, the document preprocessing unit 114 may identify the following five n-grams from the document: (i) W1; (ii) W2; (iii) W3; (iv) W1, W2; and (v) W2,W3. In some embodiments, prior to identifying permutations of words from the words in a document, the document preprocessing unit 114 removes one or more words that are deemed to indicate insignificant semantic information, e.g., words such as "a," "the," "like," etc., from the ordered combination of multiple words associated with the document.

In some embodiments, for n-grams that consist of one word (i.e., 1-grams), the document preprocessing unit 114 determines the frequency score for each 1-gram in a particular document by determining an occurrence frequency for the single word associated with the 1-gram in the particular document, applying a logarithmic transformation to the determined occurrence frequency for the 1-gram to generate a logarithmic occurrence frequency for the 1-gram in the particular document, and applying a modulo transformation to the logarithmic occurrence frequency for the 1-gram in the particular document to generate the frequency score for the 1-gram in the document.

For example, to generate the occurrence frequency for the 1-gram consisting of the word $w_i$ in a particular digital, the document preprocessing unit 114 may use the steps/operations described by the equation:

$$p(w_i) = \mathrm{mod}_a\left[\log_b\left(\frac{\Sigma w_i}{\Sigma \mathrm{words}}\right)\right],$$

where $p(w_i)$ is the frequency score for the 1-gram consisting of the word $w_i$ in the particular document, $$\frac{\Sigma w_i}{\Sigma \mathrm{words}}$$

is the occurrence frequency of the word $w_i$ in the particular document, $\Sigma w_i$ is the word count of the word $w_i$ in the particular document, $\Sigma$words is the total word count in the particular document, b is a parameter of the logarithmic transformation (with an example value of ten), and a is a parameter of the modulo transformation (with an example value of one).receives/collects an input FIG. 8 provides an operational example of a data structure 800 that includes some of the frequency scores generated for particular 1-grams based at least in part on the example document 700 depicted in FIG. 7. For example, as depicted in the data structure 800, the 1-gram "The" has occurred 46 times and has a frequency score of 0.918003565, while the 1-gram "Narmada" has occurred 10 times and has a frequency score 0.982174688. The negative relationship between the occurrence counts and frequency scores of the 1-grams "The" and "Narmada," where the former has occurred more times but has a smaller frequency score, depicts an example result of applying logarithmic and/or module transformations to occurrence frequencies to generate frequency scores. As a result of application of such transformations, less frequent words may be deemed to include greater significance for document indexing, thus creating an effect similar to the effect of term frequency-inverse document frequency (TF-IDF) scoring techniques but without the need for costly multi-document analysis required for such techniques.

Returning to FIG. 6, in some embodiments, for n-grams that include two or more words (i.e., multi-grams), the document preprocessing unit 114 determines the frequency score for each such multi-gram in a particular document based at least in part on the frequency score for each 1-gram corresponding to one word of the two or more words in the multi-gram. For example, the document preprocessing unit 114 may determine the frequency score for a particular multi-gram consisting of words $\{w_1, w_2 \ldots w_n\}$ in a particular document by performing the steps/operations described by the equation:

$$p(w_1, w_2, \ldots, w_n) = \sum_{i=1}^{n} p_i * \log_c \left[ \frac{p(w_1 \cap w_2 \ldots w_n)}{p(w_1) * p(w_2) \ldots p(w_n)} \right],$$

where $p(w_1, w_2 \ldots w_n)$ is the frequency score for the multi-gram consisting of the words $\{w_1, w_2, \ldots, w_n\}$ in the particular document, $\Sigma_{i=1}^{n} p_i$ is a measure of summation of each frequency score associated with a word of the words $\{w_1, w_2, \ldots, w_n\}$ in the particular document, $p(w_1 \cap w_2 \ldots w_n)$ is a measure of joint probability of occurrence associated with a combination of words $\{w_1, w_2, \ldots, w_n\}$ in the particular document, $p(w_1)*p(w_2) \ldots p(w_n)$ is a measure of product of each frequency score associated with a word of the words $\{w_1, w_2 \ldots w_n\}$ in the particular document, and c is a parameter (with an example value of ten) of a logarithmic transformation of a ratio of the measure of joint probability of occurrence and the measure of product. In some embodiments, the measure of joint probability of occurrence is determined based at least in part on the occurrence frequency of the particular multi-gram consisting of the words $\{w_1, w_2 \ldots w_n\}$ in the particular document.

At step/operation 602, the document preprocessing unit 114 determines, for each n-gram associated with a document and based at least in part on the semantic proximity data, a semantic relationship indicator for each pair of a word in the n-gram and a candidate semantic label determined from the semantic proximity data, where the semantic relationship indicator for a word-label pair may indicate whether there is any semantic relationship between the word in the pair and the candidate semantic label in the pair. For example, the document preprocessing unit 114 may determine that there is no semantic relationship between a word and a candidate semantic label if there is no combination of edges that connect a node corresponding to the word and a node corresponding to the candidate semantic label in a semantic proximity graph (e.g., the semantic proximity graph 500 of FIG. 5). In some embodiments, to identify one or more semantic labels, the document preprocessing unit 114 uses configuration data in the configuration data storage unit 113 and/or identifies (based at least in part on the semantic proximity data) any semantic construct having a degree of relationship lower than or equal to m with an n-gram from a document as a candidate semantic label for the document. For example, the document preprocessing unit 114 may determine that each semantic construct whose corresponding node in a semantic proximity graph is separated by two degrees or less from a word in a document is a candidate semantic label for the document.

FIG. 9 provides an operational example of a data structure 900 that includes various semantic relationship indicators for an n-gram that includes the words $\{word_1, word_2 \ldots word_n\}$. In the data structure 900, each value in a cell that is not in either of the first row and the first column designates the semantic relationship indicator for a word in the n-gram and a candidate semantic label (i.e., a sense). For example, the data structure 900 indicates that there is a semantic relationship between the word $word_1$ and the candidate semantic label $sense_1$ (denoted by the semantic relationship indicator for $word_1$ and the $sense_1$ having the value of one), while there is no semantic relationship between the word $word_2$ and the candidate semantic label $sense_1$ (denoted by the semantic relationship indicator for $word_2$ and $sense_1$ having the value zero). While the data structure 900 includes n words and n candidate semantic labels, one of ordinary skill in the art would understand that the number of words and the number of candidate semantic labels may be variable without departing from the essence of the present invention.

Returning to FIG. 6, at step/operation 603, the document preprocessing unit 114 determines a word semantic score for each combination of an occurrence of a word in an n-gram associated with a document and a candidate semantic label where the semantic relationship indicator between the word and the candidate semantic relationship indicates that there is some semantic relationship between the word and the candidate semantic relationship. In some embodiments, a contextual word semantic score for a combination of an occurrence of a word in an n-gram and a candidate semantic label indicates an estimated likelihood that a corresponding occurrence of a word in an n-gram relates to a corresponding candidate semantic label. In some embodiments, the document preprocessing unit 114 determines a word semantic label for an occurrence of a word in an n-gram and a candidate semantic label based at least in part on the frequency score for the n-gram, the frequency score for each n-gram of the one or more n-grams for the document that includes the word, and the semantic proximity indicator for the word and the candidate semantic label.

In some embodiments, the document preprocessing unit 114 determines a base semantic score for an occurrence of a word in an n-gram based at least in part on the frequency score for the n-gram and a measure of summation of the frequencies scores for all n-grams of the one or more n-grams that include the word. For example, the document preprocessing unit 114 may determine the base semantic score for an occurrence of a word $word_i$ in a particular n-gram by performing the steps/operations described in the equation:

$$p_{word_i} = \frac{count_{word_i}}{sense\_match_{word_i}},$$

where $p_{word_i}$ is the base semantic score for occurrence of the word $word_i$ in the particular n-gram, $count_{word_i}$ is a frequency score for the particular n-gram, and $sense\_match_{word_i}$ is a measure of summation of the frequencies scores for all n-grams of the one or more n-grams that include the word.

In some embodiments, after determining the base semantic score for an occurrence of a particular word in a particular n-gram, to determine the word semantic score for the occurrence of the particular word in the particular n-gram and the particular semantic label, the document preprocessing unit 114 raises the base semantic score for the occurrence to a power determined based at least in part on the semantic proximity indicator for the particular word and the particular candidate semantic label. An operational example of such a process for determining word semantic scores is depicted in FIG. 10, which provides a data structure 1000 that indicates, in cells other than those in the first row or the first column, word semantic scores for combinations of occurrences of words in a particular n-gram that includes the words {$word_1$, $word_2$ ... $word_n$} and various candidate semantic labels (i.e., senses).

As depicted in the data structure 1000 of FIG. 10, each contextual word semantic score is either zero (for word semantic scores each associated with a word and a candidate semantic label with no semantic relationship between the two) or a value $p^i$ (where p for a particular word denotes the base semantic score for occurrences of the word particular word in the particular n-gram related to the data structure 1000 and where the value of i for a word semantic score is determined based at least in part on the degree of semantic relatedness between the word associated with the word semantic score and the candidate semantic label associated with the word semantic score). For example, as depicted in the data structure 1000, the word semantic score associated with occurrence of the word $word_1$ and with the candidate semantic label $sense_1$ equals $p^1$, indicating that there is a semantic relationship between the word $word_1$ and the candidate semantic label $sense_1$ and that this semantic relationship has a degree of relatedness equal to one (i.e., is a strongest-type semantic relationship). As another example, the word semantic score associated with occurrence of the word $word_1$ and with the candidate semantic label $sense_2$ equals $p^2$, indicating that there is a semantic relationship between the word $word_1$ and the candidate semantic label $sense_2$ and that this semantic relationship has a degree of relatedness equal to two (i.e., is a second-strongest-type semantic relationship). As yet another example, the word semantic score associated with occurrence of the word $word_1$ and with the candidate semantic label $sense_n$ equals $p^3$, indicating that there is a semantic relationship between the word $word_1$ and the candidate semantic label $sense_3$ and that this semantic relationship has a degree of relatedness equal to three (i.e., is a third-strongest-type semantic relationship). As a further example, the word semantic score associated with occurrence of the word $word_2$ and with the candidate semantic label $sense_1$ equals zero, indicating that there is no semantic relationship between the word $word_3$ and the candidate semantic label $sense_1$.

Returning to FIG. 6, at step/operation 604, the document preprocessing unit 114 determines, for each n-gram of the one or more n-grams, an n-gram semantic score for the combination of the n-gram and a corresponding candidate semantic label. In some embodiments, to determine the n-gram semantic score for an n-gram, the document preprocessing unit 114 processes each word semantic score for occurrences of words in the n-gram through a multi-level condition probability transformation. For example, the document preprocessing unit 114 may determine a value $p(sense_i|word_1, word_2 \ldots word_n)$ and/or $p(sense_i|word_1 \text{receives/collects an input} \cap word_2 \ldots word_n)$, where each notation denotes a likelihood that the n-gram consisting of words {$word_1$, $word_2$ ... $word_n$} relates to a candidate semantic label $sense_i$. In some embodiments, to determine the n-gram semantic score for an n-gram, the document preprocessing unit 114 determines the degree of intersection between the senses of the word combintaions. In some embodiments, to determine the n-gram semantic score for an n-gram, the document preprocessing unit 114 determines the mutual sense score between different set of words used in a document.

FIGS. 11A-11B provide operational examples of two data structures each including various frequency scores and semantic scores for a respective document. For example, the data structure 1100 of FIG. 11A includes: various 1-gram frequency scores (e.g., the frequency score 0.1820 for the 1-gram "bank," as indicated in the field 1111); various multi-gram frequency scores (e.g., the frequency score 0.4286 for the n-gram "bank∩near," as indicated in the field. 1112); various 1-gram semantic scores (e.g., the semantic score 0.4096 for the 1-gram "bank" and the candidate semantic label "financial institute," as indicated in the field 1113); and various multi-gram semantic scores (e.g., the semantic score for the multi-gram "bank∩narmada∩near" and the candidate semantic label "besides," as indicated in the field 1114).

As another example, the data structure 1120 of FIG. 11B includes: various 1-gram frequency scores (e.g., the frequency score 0.1000 for the 1-gram "when," as indicated in the field 1121); various multi-gram frequency scores (e.g., the frequency score 0.0714 for the multi-gram "financial∩adjoins," as indicated in the field 1122); various 1-gram semantic scores (e.g., the semantic score 0.3334 for the 1-gram "word" and the candidate semantic label "term," as indicated in the field 1123); and various multi-gram semantic scores (e.g., the semantic score 0.4964 for the multi-gram "financial∩adjoins" and the candidate semantic label "bank," as indicated in the field 1124).

Returning to FIG. 4, at step/operation 407, the document preprocessing unit 114 determines, for each word in a document identified in step/operation 404, one or more aggregate semantic scores based at least in part on the semantic scores determined in step/operation 406. For example, the document preprocessing unit 114 may determine an aggregate semantic score for a word based at least in part on one or more of the semantic score for a 1-gram that consists of the word and the semantic scores for each n-gram that includes the word. In some embodiments, to determine the aggregate semantic score for a word, the document preprocessing unit 114 may adjust the semantic score for a 1-gram that consists of the word and/or the semantic scores for each n-gram that includes the word based at least in part on one or more of frequency score for the 1-gram that consists of the word, a frequency score for each n-gram that includes the word, and configuration data in the configuration data storage unit 113. In some embodiments, the document preprocessing unit 114 may adopt any candidate semantic labels whose semantic score in relation to a word exceeds a certain threshold semantic score as the semantic labels for the word. In some embodiments, the document preprocessing unit 114 may adopt a threshold number of candidate semantic labels whose semantic score in relation to a word is highest as the semantic labels for the word.

At step/operation 408, the document preprocessing unit 114 determines, for each sentence in a document identified in step/operation 403, one or more aggregate semantic scores based at least in part on the semantic scores identified in step/operation 406 and/or the aggregate semantic scores identified in step/operation 407. For example, the document preprocessing unit 114 may determine an aggregate semantic score for a sentence based at least in part on any semantic score related to an n-gram that includes at least a portion of the sentence. In some embodiments, the document preprocessing unit 114 may adopt any candidate semantic labels whose semantic score in relation to at least a portion of a sentence exceeds a certain threshold semantic score as the semantic labels for the sentence. In some embodiments, the document preprocessing unit 114 may adopt a threshold number of candidate semantic labels whose semantic score in relation to at least a portion of a sentence is highest as the semantic labels for the sentence. In some embodiments, the document preprocessing unit 114 determines the aggregate semantic score for a sentence by aggregating (e.g., using one or more aggregation operations, such as a multiplication and/or an averaging operation) the aggregate semantic score for each word in the sentence.

At step/operation 409, the document preprocessing unit 114 determines, for each document, one or more aggregate semantic scores based at least in part on the semantic scores identified in step/operation 406, the aggregate semantic scores identified in step/operation 407, and/or the aggregate semantic scores identified in step/operation 408. For example, For example, the document preprocessing unit 114 may determine an aggregate semantic score for a document based at least in part on any semantic score related to an n-gram that includes at least a portion of the document. In some embodiments, the document preprocessing unit 114 may adopt any candidate semantic labels whose semantic score in relation to at least a portion of a document exceeds a certain threshold semantic score as the semantic labels for the document. In some embodiments, the document preprocessing unit 114 may adopt a threshold number of candidate semantic labels whose semantic score in relation to at least a portion of a document is highest as the semantic labels for the document. In some embodiments, the document preprocessing unit 114 determines the aggregate semantic score for a document by aggregating (e.g., using one or more aggregation operations, such as a multiplication and/or an averaging operation) the aggregate semantic score for each word in the document and/or the aggregate semantic score for each sentence in the document.

At step/operation 410, the document preprocessing unit 114 generates an indexed representation for each document based at least in part on at least one of one or more frequency scores identified in step/operation 406, one or more semantic scores identified in step/operation 406, and one or more aggregate semantic scores identified in one or more of steps/operations 407-409. For example, the indexed representation for a document may include an aggregation of one or more semantic scores and/or frequency scores associated with n-grams in a document (e.g., semantic scores associated with a document that relate to highest-scored semantic labels for a document). As another example, the indexed representation for a document may include a graph-based representation of semantic relationships between n-grams in the document as well as one or more semantic labels for the document.

FIGS. 12A-12B each provide an operational example of an indexed representation for a document including 1-gram frequency scores, 2-gram frequency scores, and 1-gram semantic scores. For example, the indexed representation 1210 of FIG. 12A, which includes some of the frequency scores and semantic scores presented in data structure 1110 of FIG. 11A, contains various 1-gram frequency scores such as a 1-gram frequency score in the data field 1211 (which corresponds to the 1-gram frequency score in the data field 1111 of the data structure 1110), a 2-gram frequency score in the data field 1212 (which corresponds to the 2-gram frequency score in the data field 1112 of data structure 1110), and a 1-gram semantic score in the data field 1213 (which corresponds to the 1-gram semantic score in data field 1113 of data structure 1110). As another example, the indexed representation 1220 of FIG. 12B, which includes some of the frequency scores and semantic scores presented in data structure 1120 of FIG. 11B, contains various 1-gram frequency scores such as a 1-gram frequency score in the data field 1221 (which corresponds to the 1-gram frequency score in the data field 1121 of the data structure 1120), a 2-gram frequency score in the data field 1222 (which corresponds to the 2-gram frequency score in the data field 1122 of data structure 1120), and a 1-gram semantic score in the data field 1223 (which corresponds to the 1-gram semantic score in data field 1123 of data structure 1120).

FIG. 13 provides an operational example of a graph-based indexed representation 1300 for a particular document. As depicted in the graph-based indexed representation 1300, each node of the graph corresponds to either an n-gram in the particular document (e.g., node 1311 corresponding to n-gram W2 and node 1315 corresponding to n-gram W3) or a semantic label for an n-gram in the particular document (e.g., node 1302 corresponding to the semantic label W2S3 for the n-gram W2 in node 1311, node 1322 corresponding to the semantic label W2S2 for the n-gram W2 in node 1311, and node 1321 corresponding to the semantic label W3S1 for the n-gram W3 in node 1315). A dotted edge between two nodes that correspond to two n-grams (e.g., edge 1303) indicates absence of any semantic relationships between semantic labels of the two n-grams, while a solid edge between two nodes that correspond to two n-grams (e.g., 1304) indicates presence of some semantic relationship between semantic labels of the two n-grams. Moreover, positional intersection of two nodes that correspond to two semantic labels (e.g., positional intersection of nodes 1321 and 1322 that correspond to semantic labels W3S1 and W2S2 respectively) indicates presence of a semantic relationship between the two semantic labels.

Returning to FIG. 4, the document preprocessing unit 114 may store the generated indexed representations for documents in the index storage unit 115. For example, the document preprocessing unit 114 may store an indexed representation for a document in a relational database.

B. Search Query Processing

FIG. 14 depicts a flow diagram of an example process 1400 for processing a search query. A computing entity (e.g., the search engine computing entity 106 of FIG. 1) may utilize the various steps/operations of FIG. 14 to perform a search query associated with a search term based at least in part on indexed representations a plurality of documents (e.g., the indexed representations generated by process 400 of FIG. 4).

The process 1400 starts at step/operation 1401 by receiving a search query with a search term. For example, the query processing unit 116 may receive a hyper-text transfer protocol (HTTP) request (e.g., a GET request or a POST request) that indicates a search request, and may determine the search term based at least in part on a parameter of the HTTP request. The search term may include one or more n-grams. In some embodiments, the query processing unit 116 may generate a final search term by transforming an input search term by adding one or more n-grams to the search term (e.g., by expanding the input search term to include synonyms of the n-grams in the search term), modifying one or more n-grams in the search term, and/or removing one or more n-grams from the search term (e.g., by removing terms deemed semantically insignificant, such as "a," "the," etc.). In some embodiments, the query processing unit 116 may expand an input search query by adding to the n-grams in the input search query n-grams deemed semantically equivalent (e.g., synonymous) to the n-grams in the input search query that are from linguistic and/or technical domains different from a linguistic and/or technical domain of the search query. Aspects of such embodiments are described in greater detail below with reference to FIG. 15, which provides a data flow diagram of an example process 1500 for cross-lingual document pre-processing and query processing.

At step/operation 1402, in response to the search query received at step/operation 1404, the query processing unit 116 processes the indexed representation for each document in the plurality of documents to generate a relevance score for the document. The relevance score for a document with respect to a search query may indicate an estimated likelihood that the document is a desired result for the search query. In some embodiments, the query processing unit 116 retrieves one or more frequency scores, one or more semantic scores, and/or one or more semantic labels from the indexed representation to generate the relevance score for a document with respect to a query. In some embodiments, the query processing unit 116 retrieves each indexed representation for a document from the indexed storage unit 115.

For example, the plurality of documents may include a document D1 consisting of the sentence "The bank of Baroda near bank of Narmada is dangerously surviving" corresponding to the indexed representation 1210 of FIG. 12A and a document D2 consisting of the sentence "When the word financial adjoins the word institute results in the word financial institute" corresponding to the indexed representation 1220 of FIG. 12B. Given a search term "financial institute adjoining river," a semantically intelligent search engine system should optimally distinguish between the first use of the term bank in D1 and the second use of the term bank in D1 to determine that the first use refers to a financial institution while the second term refers to a riverside, and thus generate a higher relevance score for document D1 compared to the document D2. This is because, when properly processed through intelligent semantic analysis, document D1 discusses a financial institution near a riverside, which is semantically close to the search term "financial institute adjoining river."

In some embodiments, to determine the relevance score for the document D1 discussed above in relation to the search term "financial institute adjoining river," the query processing unit 116 performs the operations corresponding to the following calculations:

Relevance Score (D1, "financial institute adjoining river")=[$p$(financial institute|bank)+receives/collects an input$p$(bank)+$p$(bank∩narmada)+$p$(narmada)+$p$(river|narmada)]+[$p$(financial institute|bank)+$p$(bank)+$p$(bank∩near)+$p$(near)+$p$(adjoining|near)]+[$p$(adjoining|near)+$p$(near)+$p$(near∩narmada)+$p$(narmada)+$p$(river|narmada)]=

[0.4096+0.1820+0.4286+0.0900+0.5000]+

[0.4096+0.1820+0.3571+0.0900+0.7412]+

[0.7412+0.0900+0.5000+0.0900+0.5000]=5.3113.receives/collects an input

In some embodiments, to determine the relevance score for document D2 discussed above in relation to the search term "financial institute adjoining river," the query processing unit 116 performs the operations corresponding to the following calculations:

Relevance Score (D2, "financial institute adjoining river")=[$p$(financial institute|financial)+$p$(financial)+$p$(financial∩institute)+$p$(institute)]+[$p$(financial institute|financial)+$p$(financial)+$p$(financial∩adjoins)+$p$(adjoins)]=[0.5000+0.2000+0.2857+0.2000]+[0.5000+0.2000+0.0900+0.1000]=2.0757.receives/collects an input At step/operation 1403, the query processing unit 116 returns one or more search results in response to the search query, where each search result includes an identifier of (e.g., a link to) a document of the plurality of documents. In some embodiments, the one or more search results are ranked based at least in part on the relevance scores of the documents corresponding to the search results, e.g., ranked in an order defined by the relevance score of the documents corresponding to the search results. For example, the query processing unit 116 may return search results having higher relevance scores on top of the search results having lower relevance scores.

In some embodiments, the one or more search results are selected and/or ranked based at least in part on a semantic relevance score for each search result. The semantic significance score for a search result (e.g., a document) may be a score determined based at least in part on the semantic scores of various n-grams associated with the search result in relation to a particular sense label for the search result, where the sense label may be selected by a user of the search engine computing entity 106. In some embodiments, the search result comprises one or more result documents of the plurality of documents; each result document of the one or more result documents is associated with a semantic significance score in relation to a sense label for the search query; each semantic significance score for a result document is determined based on semantic scores associated with the result document and the sense label for the search query; the search result is characterized by a ranking of the one or more result documents; and the ranking is performed based at least in part on each semantic significance score associated with a result document of the one or more result documents. In some embodiments, the sense label for the search query is determined based at least in part on one or more semantic labels for the search query and a user sense label selection.

FIG. 17 provides an operational example of a user interface 1700 configured to provide such semantically-intelligent searching capabilities with user-selectable sense labels. As depicted in the user interface 1700 of FIG. 17, a user has entered a search term "google glass chef" into the search bar 1701 of the user interface 1700. The search engine computing entity 106 has determined that the entered search term relates to three potential sense labels (i.e., "Food and Technology," "Technology," and "Food"), whose respective indications appear in portion 1702 of the user interface 1700 along with a parenthetical number for each indication that indicates a quantity of search results that correspond to the particular sense label. This may be because the term "google glass chef" is semantically ambiguous and thus potentially relates to different sense labels. Portion 1702 of the user interface 1700 includes a respective selection user interface for each semantic label. By selecting a semantic label using a respective selection user interface in portion 1702, the user can request that the search engine computing entity 106 selects and ranks search results based at least in part on semantic significance scores determined using the selected semantic label. Thus, user interface 1700 allows a user to filter search results and search result rankings based on user-selected sense labels for a search query.

C. Cross-Lingual Searching

FIG. 15 depicts a data flow diagram of an example process 1500 for cross-lingual searching of documents. A computing entity (e.g., the search engine computing entity 106 of FIG. 1) may utilize the various steps/operations of FIG. 15 to preprocess documents to generate cross-lingual indexed representation and to process queries in one linguistic domain using documents in other linguistic domains.

Process 1500 begins by storing domain-specific semantic proximity data in the configuration data storage unit 113. For example, as depicted in FIG. 15, the configuration data storage unit 113 includes English semantic proximity data 1531, Spanish semantic proximity data 1532, and French semantic proximity data 1533. The domain-specific semantic proximity data for each linguistic domain depict semantic relationships between semantic constructs of the particular linguistic domain, as those semantic relationships are defined by the vocabulary and/or grammar rules of the respective linguistic domain.

Process 1500 continues by retrieving domain-specific semantic proximity data for each linguistic domain by the preprocessing subunit for the linguistic domain in the document preprocessing unit 114. Each preprocessing subunit for a linguistic domain in turn uses the semantic proximity data for the particular linguistic domain to generate domain-specific semantic scores for each document of a plurality of documents. For example, the English preprocessing subunit 1541 of the document preprocessing unit 114 uses the English semantic proximity data 1531 in the configuration data storage unit 113 to generate English semantic scores for each document. As another example, the Spanish preprocessing subunit 1542 of the document preprocessing unit 114 uses the Spanish semantic proximity data 1532 in the configuration data storage unit 113 to generate Spanish semantic scores for each document. As yet another example, the French preprocessing subunit 1543 of the document preprocessing unit 114 uses the French semantic proximity data 1533 in the configuration data storage unit 113 to generate French semantic scores for each document. In some embodiments, a domain-specific preprocessing subunit generates semantic scores using various steps/operations of process 400 of FIG. 4.

Process 1500 continues by aggregating, using the indexing subunit 1547 of the document preprocessing subunit 115, the various domain-specific semantic scores for each document (e.g., the English semantic scores generated by the English preprocessing subunit 1541 of the document preprocessing unit 114, the Spanish semantic scores generated by the Spanish preprocessing subunit 1542 of the document preprocessing unit 114, and the French preprocessing subunit 1543 of the document preprocessing unit 114) to generate a cross-lingual indexed representation for the document. For example, the cross-lingual indexed representation for a document may include, in addition to n-gram frequency scores for the document, semantic scores for the document that relate to two or more linguistic domains. In some embodiments, the indexing subunit 1547 generates indexed representations from semantic scores and/or other data using various steps/operations of the process 400 of FIG. 4. The indexing subunit 1547 of the document preprocessing unit 114 may store the cross-lingual indexed representations 1551 of documents in the index storage unit 115.receives/collects an input Process 1500 continues by receiving a search query using a search application user interface (API) 1566 of the query processing unit 116. The search API 1566 provides an input search term for the search query to the query expansion subunit 1565 of the query processing unit 116, which expands the input search term by adding additional search terms deemed equivalent to the input search term, e.g., additional search terms in one or more linguistic domains other than the linguistic domain of the input search. For example, given an input search term in linguistic domain L1 and given system languages {L1, L2, L3}, the query expansion subunit 1565 of the query processing unit 116 may modify the input search term to add n-grams deemed semantically equivalent to the input search term in linguistic domains L2 and L3. In some embodiments, the query expansion subunit 1565 detects semantically equivalent words for each word in the search term by calculating a hash value for each term using a hashing function (e.g., a hashing function associated with a cross-lingual and/or cross-domain dictionary data structure) and identifying other words having the same hash function (e.g., using a cross-lingual and/or cross-domain dictionary data structure). The query expansion subunit 1565 may provide the linguistically expanded search term to the cross-lingual processing subunit 1564 receives/collects an input of the query processing unit 116.

Process 1500 continues by determining search results corresponding to the linguistically expanded search term by the cross-lingual processing subunit 1564 receives/collects an input of the query processing unit 116. In some embodiments, the cross-lingual processing subunit 1564 receives/collects an input of the query processing unit 116 generates, for each document, domain-specific relevance scores each corresponding to a particular linguistic domain based at least in part on the semantic scores for the document that relate to the particular linguistic domain. For example, for a first document, the cross-lingual processing subunit 1564 may generate an English relevance score based at least in part on the frequency scores for the first document and the English semantic scores for the first document, a Spanish relevance score based at least in part on the frequency scores for the first document and the Spanish semantic scores for the first document, and a French relevance score based at least in part on the frequency scores for the first document and the French semantic scores for the first document. In some embodiments, the cross-lingual processing unit 1564 generates relevance scores using various steps/operations of the process 1400 of FIG. 14.

Process 1500 continues by generating a cross-lingual relevance score for each document. In some embodiments, the cross-lingual processing unit 1564 of the query processing unit 116 aggregates (e.g., averages and/or sums) domain-specific relevance scores for each document to generate the cross-lingual relevance score for the document. The cross-lingual processing unit 1564 may generate search results based at least in part on the cross-lingual relevance scores, e.g., using various steps/operations of the process 1400 of FIG. 14, and provide those generated search results to the search API 1566 of the query processing unit 116. The search API 1566 may in turn transmit the search result to a client computing entity 102A-D for presentation to an end user of the client computing entity 102A-D.

D. Multi-Device Search System

In some embodiments, the document preprocessing techniques discussed herein (e.g., the document processing techniques described in reference to process 400 of FIG. 4) and/or the search query processing techniques discussed herein (e.g., the search query processing techniques described in reference to process 1400 of FIG. 14) can be used to generate indexed representations of documents and/or to process search queries directed to a corpus of documents using devices that have reduced memory and/or processing capabilities, e.g., client devices in an enterprise system. This is because the techniques described herein are both memory efficient and computationally efficient (e.g., aspects of the techniques described herein store semantic relationships in linguistic domains using undirected graphs that are both efficient to store and efficient to traverse). Thus, using the techniques described herein enables a system of one or more computers, e.g., an enterprise searching system with many client devices, to perform document preprocessing and/or search query processing on client devices, even when those client devices are in an offline mode and without access to a centralized server.

For example, using various aspects of the document preprocessing and/or search query processing techniques described herein, client devices in an enterprise system may be configured to index documents stored on such client devices in an offline mode and utilize those indexes to process search queries in offline mode. As another example, client devices in an enterprise system may be tasked with indexing a portion of a large corpus of document and/or generate search results using a portion of a large corpus of indexed representation. In this way, at least a portion of document preprocessing and/or search query processing tasks may be distributed between various entities in a system of multiple computers. This in turn has various advantages both in terms of efficiency and security. For example, in terms of efficiency, the proposed indexing and/or searching techniques lessen the computational burden on centralized search systems, which may in turn increase both the speed and the reliability of search functions, especially in larger enterprise systems with a greater multiplicity of devices and larger corpuses of searchable documents. As another example, in terms of security, the proposed indexing and/or searching techniques lessen the security risks associated with security breaches in centralized search systems by increasing the number of indexing and/or searching agents in a multi-device search system.

FIG. 16 provides an operational example of such an enterprise system 1600 with multiple enterprise devices (e.g., enterprise device 1601) and multiple personal devices (e.g., personal device 1603). Each enterprise device or personal device may be configured to generate indexed representations of a portion of documents related to the enterprise system 1600 and/or process a portion of such documents in response to a search query. Moreover, the enterprise system 1600 includes a sense-based search system 1604 that receives search queries from users 1605. In response to a search request, the sense-based search system requests search results from each personal device and from a search result consolidation agent 1602. The search result consolidation agent 1602 in turn requests and receives search results from each enterprise device, consolidates the search results received from each enterprise device, and provides the consolidated search results to the sense-based search system 1604. The sense-based search system 1604 in turn consolidates the search results obtained from the search result consolidation agent 1602 and from each client device to generate final search results, which the sense-based search system 1604 provides to the user 1605 who initiated a search query. Through the mentioned steps/operations, the enterprise system 1600 can enable distributed indexing and/or distributed searching in a multi-device system.

E. Clinical Searching Receives/Collects an Input

Various aspects of the inventions described herein relate to document preprocessing and/or search query processing using semantically intelligent features from documents. Such aspects enable a search system that is better capable of disambiguating between various semantic labels of the same word based at least in part on context of the word in a document. This makes the proposed indexing and/or searching techniques ideal for search systems configured to work with documents associated with technical domains in which common words are sometimes used with technical definitions and/or in which same words are used to refer to different phenomena and/or entities. An example of such systems are the search systems used in medical and clinical settings. For example, in medical and clinical settings, it would be desirable for a search system to recognize that the term "cold" in a document that includes the phrases "cold medicine" is referring to a disease and not a temperature designation. Indeed, a study of four hundred thousand medical citations showed that 94.3 percent of those citations included semantic ambiguities where at least a term in the title or abstract of the citations refers to more than one concept defined by the Unified Medical Language System (UMLS). Thus, by enabling semantically intelligent disambiguation of words during indexing and/or search query processing, aspects of the present invention enable efficient searching in medical and clinical settings.

For example, consider the following three sentences in medical documents: (i) "A greater proportion of mesophil microorganisms were to be found during the cold months than in warmer months"; (ii) "In a controlled randomized trial we analyzed whether the use of the term "smoker's lung" instead of chronic bronchitis when talking to patients with chronic obstructive lung disease (cold) changed their smoking habits"; (iii) "The overall infection rate was 83% and of those infected, 88% felt that they had a cold." The word "cold," as evident from the above three examples, has multiple meanings, which our proposed systems are capable of disambiguating. Such disambiguation enables better processing of medical notes, e.g., clinical notes. For example, better processing of clinical notes would have advantages for medical payer institutions (e.g., insurance companies) as well as customer service systems that rely on such clinical notes for their work.

F. Other Use Cases

In addition to and/or instead of the above-noted use cases, the indexing and searching techniques discussed in this document can be used to enable searching of healthcare-related documents based at least in part on concepts and keyword related to the Unified Medical Language System (UMLS). Research has shown that 11.7% of more than 34 million phrases with ambiguous words.receives/collects an input For example, the word culture as used in UMLS could refer to an anthropological culture (e.g., Mayan culture of the Mayan civilization) and a laboratory culture (e.g., a cell culture).receives/collects an input The proposed search systems provide better alternatives for disambiguation and search relevancy of UMLS-based data sources.

As another example, ambiguous words are very common in transcriptions of comments by medical providers. Provider transcriptions generated by medical providers can explain the same procedure differently on different occasions. For example, observations show that the language used to describe a specific procedure can be easily confused with some other procedure due to one or more terms carrying multiple meanings, which can in turn lead to wrong procedure codes in the transcription by the medical coders. For example, the term "calculus" may be used to refer to "kidney stone" or "heel bone." As another example, the term "pelvis" can may be used to refer to "funnel shaped area in kidney" or "hip bones with sacrum and coccyx." It is very important that such ambiguous words used in transcriptions be accurately transformed into respective codes (e.g., Current Procedure Technology (CPT) codes) in order to reflect the correct procedure. Our proposed system can help resolve such ambiguities in current systems and provide better provider transcriptions into codes (e.g., CPT codes).

As yet another example, it is very important to understand meanings of ambiguous terms correctly in automatic chatbots. While chatbots are starting to share the load of agents in order to provide fast resolution to the end customer in many customer service systems (e.g., customer service systems in medical institutions), it is of utmost importance to understand the user intentions properly. This task is complicated by the fact that some terms can be used in a single utterance to point to different concepts. For example, in the utterance "surgeon used dermatome to remove birthmark from my neck dermatome area, I am not sure if it was the correct way of performing the test, I am in severe pain post that day, I would like to get in touch with specialist as soon as I can," the term "dermatome" carries two meanings (i.e., an area of skin that sends sensory information to spinal cord and a surgical instrument used to make shallow and continuous cuts during skin grafting). Our proposed system can help solve such ambiguities in current chatbot systems by accurately establishing the appropriate meanings to such terms in utterances and help existing chatbot system in generating better automatic responses.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, the foregoing description provides various examples of utilizing systems and methods for monitoring cognitive capability of a user. However, it should be understood that various embodiments of the systems and methods discussed herein may be utilized for providing reminders of any activity, such as exercising, eating healthy snacks, performing a particular task, calling another individual, and/or the like.

The invention claimed is:

1. A computer-implemented method for performing a search query associated with a plurality of search terms based at least in part on a plurality of documents, the computer-implemented method comprising:
   performing, by one or more processors, pre-processing of each document of the plurality of documents, wherein (1) each document of the plurality of documents comprises a plurality of words to generate an indexed representation of each document of the plurality of documents, and (2) the pre-processing of a document of the plurality of documents comprises:
   identifying, by the one or more processors, one or more sentences in the document, wherein each sentence of the one or more sentences comprises one or more words from the plurality of words in the document;
   generating, by the one or more processors and for each n-gram of one or more n-grams associated with the document, one or more n-gram semantic scores based at least in part on one or more semantic proximity indicators for the corresponding n-gram, wherein (1) each n-gram of the one or more n-grams associated with the document comprises a combination of one or more words from the plurality of words in the document, (2) each semantic proximity indicator of the one or more semantic proximity indicators for an n-gram indicates a degree of semantic relatedness between a corresponding word of the one or more words in the n-gram and a corresponding candidate semantic label of one or more candidate semantic labels associated with the document, (3) each n-gram semantic score of the one or more n-gram semantic scores for a document is generated based at least in part on one or more frequency scores for the n-gram, and (4) the one or more frequency scores for a first one-gram of the one or more n-grams in the document are generated by (a) applying a logarithmic transformation to an occurrence frequency for the first one-gram in the document to generate a logarithmic occurrence frequency for the first one-gram in the document, and applying a modulo transformation to the logarithmic occurrence frequency to generate the one or more frequency scores for the first one-gram in the document;
   determining, by the one or more processors and based at least in part on each n-gram semantic score of the one or more n-gram semantic scores for an n-gram of the one or more n-grams, one or more semantic labels for each sentence of the one or more sentences in the document; and
   generating, by the one or more processors, the indexed representation for the document of the plurality of documents based at least in part on the one or more semantic labels for each sentence of the one or more sentences in the document;
   processing, by the one or more processors, the search query based at least in part on (1) the plurality of search terms, and (2) each indexed representation associated with a document of the plurality of documents, wherein the processing the search query comprises:
   providing, by the one or more processors, the search query to a data storage unit, wherein (1) the data storage unit executes the search query to generate one or more search results for the search query, and (2) executing the search query comprises:
      generating, for each document of the plurality of documents, a relevance score in relation to the search query based at least in part on (1) one or more selected semantic labels for the document, (2) the one or more frequency scores, and (3) the one or more n-gram semantic scores; and
      generating the one or more search results based at least in part on the relevance scores for each document of the plurality of documents, wherein the one or more search results are ranked based at least in part on the relevance scores for each document of the plurality of documents; and transmitting, by the one or more processors, the one or more search results to a computing device associated with the search query, wherein the one or more search results are displayed by the computing device.

2. The computer-implemented method of claim 1, wherein the one or more n-grams for a document comprise a first multi-gram associated with two or more words comprising a first word and one or more other words, wherein each word of one or more other words is selected from the group consisting of a word that occurs within a threshold distance of the first word in the document and a word deemed co-referencing with the first word.

3. The computer-implemented method of claim 1, wherein:
   each n-gram semantic score is associated with a linguistic domain of a plurality of linguistic domains;
   the one or more n-gram semantic scores associated with each linguistic domain of the plurality of linguistic domains are determined based at least in part on semantic proximity data for the linguistic domain; and
   the semantic proximity data for a linguistic domain of the plurality of linguistic domains comprise one or more semantic proximity relationships associated with the linguistic domain.

4. The computer-implemented method of claim 3, wherein the one or more frequency scores for a first multi-gram of the one or more n-grams in a document are generated by:
   determining a plurality of one-grams associated with the first multi-gram, wherein each one-gram of the plurality of one-grams comprises a word from a plurality of words associated with the first multi-gram;
   generating a measure of summation of each frequency score associated with a one-gram of the plurality of one-grams;
   generating a measure of product of each frequency score associated with a one-gram of the plurality of one-grams;
   applying a logarithmic function to a ratio of a measure of joint probability of occurrence of the plurality of words and the measure of product to generate a logarithmic frequency value; and
   generating the frequency score for the first multi-gram based at least in part on the measure of summation and the logarithmic frequency value.

5. The computer-implemented method of claim 1, wherein:
   the degree of semantic relatedness between a first word of a first n-gram of the one or more n-grams and a first candidate semantic label of the one or more candidate semantic labels is determined based at least in part on a degree of separation of a first node corresponding to the first word and a second node corresponding to the first candidate semantic label in a semantic proximity graph;
   the semantic proximity graph comprises one or more nodes, wherein each node of the one or more nodes corresponds to a semantic construct of a plurality semantic constructs and one or more edges, wherein each edge of the one or more edges corresponds to a strongest-type semantic relationship between a first semantic construct of the plurality semantic constructs and a second semantic construct of the plurality semantic constructs; and the plurality semantic constructs comprise the one or more candidate semantic labels and at least some of the plurality of words.

6. The computer-implemented method of claim 1, wherein the semantic proximity indicator between a first word of the one or more words and a first semantic label of the one or more semantic labels has a value of zero if there is no semantic relationship between the first word and the first semantic label.

7. The computer-implemented method of claim 1, wherein generating the one or more first n-gram semantic scores for a first n-gram of the one or more n-grams comprises:
   generating, for each word of the one or more words in the first n-gram and each first semantic label of the one or more semantic labels, a word semantic score for occurrence of the word in the first n-gram based at least in part on a frequency score for the first n-gram, a frequency score for each n-gram of the one or more n-grams that comprises the word, and a semantic proximity indicator for the word and a first semantic label of the one or more semantic labels for the document;
   generating, based at least in part on each word semantic score for a word of the one or more words in the first n-gram that is associated with a second semantic label of the one or more semantic labels, a first n-gram semantic score of the one or more first n-gram semantic scores for the first n-gram and the second semantic label.

8. The computer-implemented method of claim 1, wherein:
   the one or more search results comprise one or more result documents of the plurality of documents;
   each result document of the one or more result documents is associated with a semantic significance score in relation to a sense label for the search query;
   each semantic significance score for the corresponding result document is generated based at least in part on semantic scores associated with the result document and the sense label for the search query;
   the one or more search results are characterized by a ranking of the one or more result documents; and
   the ranking is performed based at least in part on each semantic significance score associated with a result document of the one or more result documents.

9. The computer-implemented method of claim 8, wherein the sense label for the search query is generated based at least in part on a user sense label selection.

10. An apparatus comprising at least one processor and at least one memory comprising computer program code, the at least one memory and the computer program code configured to, with the at least one processor, cause the apparatus to perform a method for performing a search query associated with a plurality of search terms based at least in part on a plurality of documents, the method comprising:
    performing pre-processing of each document of the plurality of documents, wherein (1) each document of the plurality of documents comprises a plurality of words to generate an indexed representation of each document of the plurality of documents, and (2) the pre-processing of a document of the plurality of documents comprises:
       identifying one or more sentences in the document, wherein each sentence of the one or more sentences comprises one or more words from the plurality of words in the document;

generating, for each n-gram of one or more n-grams associated with the document, one or more n-gram semantic scores based at least in part on one or more semantic proximity indicators for the corresponding n-gram, wherein (1) each n-gram of the one or more n-grams associated with the document comprises a combination of one or more words from the plurality of words in the document, (2) each semantic proximity indicator of the one or more semantic proximity indicators for an n-gram indicates a degree of semantic relatedness between a corresponding word of the one or more words in the n-gram and a corresponding candidate semantic label of one or more candidate semantic labels associated with the document, (3) each n-gram semantic score of the one or more n-gram semantic scores for a document is generated based at least in part on one or more frequency scores for the n-gram, and (4) the one or more frequency scores for a first one-gram of the one or more n-grams in the document are generated by (a) applying a logarithmic transformation to an occurrence frequency for the first one-gram in the document to generate a logarithmic occurrence frequency for the first one-gram in the document, and applying a modulo transformation to the logarithmic occurrence frequency to generate the one or more frequency scores for the first one-gram in the document;

determining, based at least in part on each n-gram semantic score of the one or more n-gram semantic scores for an n-gram of the one or more n-grams, one or more semantic labels for each sentence of the one or more sentences in the document; and generating the indexed representation for the document of the plurality of documents based at least in part on the one or more semantic labels for each sentence of the one or more sentences in the document;

processing the search query based at least in part on (1) the plurality of search terms, and (2) each indexed representation associated with a document of the plurality of documents, wherein the processing the search query comprises:

providing the search query to a data storage unit, wherein (1) the data storage unit executes the search query to generate one or more search results for the search query, and (2) executing the search query comprises:

generating, for each document of the plurality of documents, a relevance score in relation to the search query based at least in part on (1) one or more selected semantic labels for the document, (2) the one or more frequency scores, and (3) the one or more n-gram semantic scores; and generating the one or more search results based at least in part on the relevance scores for each document of the plurality of documents, wherein the one or more search results are ranked based at least in part on the relevance scores for each document of the plurality of documents; and transmitting the one or more search results to a computing device associated with the search query, wherein the one or more search results are displayed by the computing device.

11. The apparatus of claim 10, wherein the one or more n-grams for a document comprise a first multi-gram associated with two or more words comprising a first word and one or more other words, wherein each word of one or more other words is selected from the group consisting of a word that occurs within a threshold distance of the first word in the document and a word deemed co-referencing with the first word.

12. The apparatus of claim 10, wherein:
each n-gram semantic score is associated with a linguistic domain of a plurality of linguistic domains;
the one or more n-gram semantic scores associated with each linguistic domain of the plurality of linguistic domains are generated based at least in part on semantic proximity data for the linguistic domain; and
the semantic proximity data for a linguistic domain of the plurality of linguistic domains comprise one or more semantic proximity relationships associated with the linguistic domain.

13. The apparatus of claim 10, wherein:
the degree of semantic relatedness between a first word of a first n-gram of the one or more n-grams and a first candidate semantic label of the one or more candidate semantic labels is determined based at least in part on a degree of separation of a first node corresponding to the first word and a second node corresponding to the first candidate semantic label in a semantic proximity graph;
the semantic proximity graph comprises one or more nodes, wherein each node of the one or more nodes corresponds to a semantic construct of a plurality semantic constructs and one or more edges, wherein each edge of the one or more edges corresponds to a strongest-type semantic relationship between a first semantic construct of the plurality semantic constructs and a second semantic construct of the plurality semantic constructs; and
the plurality semantic constructs comprise the one or more candidate semantic labels and at least some of the plurality of words.

14. A computer program product comprising a non-transitory computer readable medium storing computer readable instructions, the computer readable instructions configured, when executed by a processor, to cause the processor to perform a method for performing a search query associated with a plurality of search terms based at least in part on a plurality of documents, the method comprising:

performing pre-processing of each document of the plurality of documents, wherein (1) each document comprises a plurality of words to generate an indexed representation of each document of the plurality of documents, and (2) the pre-processing of a document of the plurality of documents comprises:

identifying one or more sentences in the document, wherein each sentence of the one or more sentences comprises one or more words from the plurality of words in the document;

generating, for each n-gram of one or more n-grams associated with the document, one or more n-gram semantic scores based at least in part on one or more semantic proximity indicators for the corresponding n-gram, wherein (1) each n-gram of the one or more n-grams associated with the document comprises a combination of one or more words from the plurality of words in the document, (2) each semantic proximity indicator of the one or more semantic proximity indicators for an n-gram indicates a degree of semantic relatedness between a corresponding word of the one or more words in the n-gram and a corresponding candidate semantic label of one or more candidate semantic labels associated with the document, (3) each n-gram semantic score of the one or more n-gram semantic scores for a document is generated based at least in part on one or more frequency scores for the n-gram, and (4) the one or more frequency scores for a first one-gram of the one or more n-grams in the document are generated by (a) applying a logarithmic transformation to an occurrence frequency for the first one-gram in the document to generate a logarithmic occurrence frequency for the first one-gram in the document, and applying a modulo transformation to the logarithmic occurrence frequency to generate the one or more frequency scores for the first one-gram in the document;

determining, based at least in part on each n-gram semantic score of the one or more n-gram semantic scores for an n-gram of the one or more n-grams, one or more semantic labels for each sentence of the one or more sentences in the document; and generating the indexed representation for the document of the plurality of documents based at least in part on the one or more semantic labels for each sentence of the one or more sentences in the document;

processing the search query based at least in part on (1) the plurality of search terms, and (2) each indexed representation associated with a document of the plurality of documents, wherein the processing the search query comprises:

providing the search query to a data storage unit, wherein (1) the data storage unit executes the search query to generate one or more search results for the search query, and (2) executing the search query comprises:

generating, for each document of the plurality of documents, a relevance score in relation to the search query based at least in part on (1) one or more selected semantic labels for the document, (2) the one or more frequency scores, and (3) the one or more n-gram semantic scores; and generating the one or more search results based at least in part on the relevance scores for each document of the plurality of documents, wherein the one or more search results are ranked based at least in part on the relevance scores for each document of the plurality of documents; and transmitting the one or more search results to a computing device associated with the search query, wherein the one or more search results are displayed by the computing device.

\* \* \* \* \*

UNITED STATES PATENT AND TRADEMARK OFFICE
CERTIFICATE OF CORRECTION

PATENT NO. : 11,113,327 B2
APPLICATION NO. : 16/274464
DATED : September 7, 2021
INVENTOR(S) : Singh et al.

Page 1 of 1

It is certified that error appears in the above-identified patent and that said Letters Patent is hereby corrected as shown below:

In the Claims

Column 34
Line 52, "the processing the search query comprises:" should read --processing the search query comprises:--

Column 40
Line 2, "wherein the processing" should read --wherein processing--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*